US012300184B2

(12) United States Patent
Lee et al.

(10) Patent No.: US 12,300,184 B2
(45) Date of Patent: May 13, 2025

(54) DISPLAY APPARATUS INCLUDING MULTIPLE DEMULTIPLEXERS

(71) Applicant: Samsung Display Co., Ltd., Yongin-Si (KR)

(72) Inventors: Jaesic Lee, Yongin-si (KR); Wonkyu Kwak, Yongin-si (KR); Kyunghoon Kim, Yongin-si (KR); Mincheol Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 55 days.

(21) Appl. No.: 18/143,035

(22) Filed: May 3, 2023

(65) Prior Publication Data

US 2023/0368742 A1 Nov. 16, 2023

(30) Foreign Application Priority Data

May 16, 2022 (KR) ........................ 10-2022-0059852
Aug. 16, 2022 (KR) ........................ 10-2022-0102225

(51) Int. Cl.
*G09G 3/3275* (2016.01)

(52) U.S. Cl.
CPC ... *G09G 3/3275* (2013.01); *G09G 2300/0452* (2013.01); *G09G 2310/0272* (2013.01)

(58) Field of Classification Search
CPC ......... G09G 3/3275; G09G 2300/0452; G09G 2310/0272; G09G 2300/0426; G09G 2300/0819; G09G 2300/0861; G09G 2310/0251; G09G 2310/0297; G09G 2310/08; G09G 2320/043; G09G 3/3233
See application file for complete search history.

(56) References Cited

U.S. PATENT DOCUMENTS

| | | | | |
|---|---|---|---|---|
| 7,365,714 | B2 | 4/2008 | Yoo | |
| 10,115,351 | B2 | 10/2018 | Kim | |
| 10,872,562 | B2 | 12/2020 | Na | |
| 11,488,542 | B2 | 11/2022 | Yoon et al. | |
| 2008/0122819 | A1 | 5/2008 | Cho et al. | |
| 2016/0019842 | A1 * | 1/2016 | Kim .................... | G09G 3/3291 345/694 |

FOREIGN PATENT DOCUMENTS

| | | | |
|---|---|---|---|
| KR | 10-0476368 | B1 | 3/2005 |
| KR | 10-0872352 | B1 | 12/2008 |
| KR | 10-2019-0062679 | A | 6/2019 |
| KR | 10-2019-0100550 | A | 8/2019 |
| KR | 10-2211694 | B1 | 2/2021 |

* cited by examiner

*Primary Examiner* — Rodney Amadiz
(74) *Attorney, Agent, or Firm* — Innovation Counsel LLP

(57) ABSTRACT

Provided is a display apparatus comprising a data driving circuit configured to output data signals through a plurality of output lines, a data distribution circuit including a first switch and a second switch, wherein the first switch connects a first data line to a first output line in response to a first control signal, and the second switch connects the second data line to the first output line in response to a second control signal, and a control circuit configured to alternately output the first control signal and the second control signal during each line time of one frame.

20 Claims, 14 Drawing Sheets

R : R11,R31,R22,R42,R13,R33,R24,R44
B : B21,B41,B12,B32,B33,B43,B14,B34
G : G11,G21,G31,G41,G12,G22,G32,G42,
G13,G23,G33,G43,G14,G24,G34,G44

DISPLAY APPARATUS INCLUDING MULTIPLE DEMULTIPLEXERS

CROSS-REFERENCE TO RELATED APPLICATIONS

This application is based on and claims priority under 35 U.S.C. § 119 to Korean Patent Application Nos. 10-2022-0059852, filed on May 16, 2022, and 10-2022-0102225, filed on Aug. 16, 2022, in the Korean Intellectual Property Office, the disclosures of which are incorporated by reference herein in their entireties.

BACKGROUND

1. Field

The present disclosure generally relates to a display apparatus. More particularly, the present disclosure relates to a display apparatus capable of reducing quality degradation due to external noise introduced through data lines, and a method of driving the display apparatus.

2. Description of the Related Art

A display apparatus includes gate lines, data lines, and pixels arranged in portions in which the gate lines cross the data lines. To apply data signals respectively to the data lines, a data driver has to include output lines, of which the number corresponds to the number of data lines, and as multiple integrated circuits are required, manufacturing costs increase.

SUMMARY

One or more embodiments provide a display apparatus in which the number of output lines of a data driver is reduced, and a method of driving the display apparatus. Also, one or more embodiments provide a display apparatus capable of reducing quality degradation due to external noise introduced through data lines, and a method of driving the display apparatus. However, this is merely an example, and the scope of the disclosure is not limited thereto.

Additional aspects will be set forth in part in the description which follows and, in part, will be apparent from the description, or may be learned by practice of the presented embodiments of the disclosure.

According to one or more embodiments, a display apparatus includes a pixel unit including a first data line and a second data line, a data driving circuit configured to output data signals through a plurality of output lines, a data distribution circuit including a first switch and a second switch, wherein the first switch connects a first output line among the plurality of output lines to the first data line in response to a first control signal, and the second switch connects the first output line to the second data line in response to a second control signal, and a control circuit configured to alternately output the first control signal and the second control signal during each line time of one frame, wherein the line time includes a first line time and a second line time that is subsequent to the first line time, the control circuit is configured to consecutively output the first control signal during a second line time of a previous line time and a first line time of a current line time, and consecutively output the second control signal during a second line time of the current line time and a first line time of a next line time.

The data driving circuit may be configured to output the data signal in synchronization with output timings of the first control signal and the second control signal during each line time.

The second data line may be apart from the first data line by a one-column interval.

The pixel unit may include a plurality of first pixels emitting light of a first color, a plurality of second pixels emitting light of a second color, and a plurality of third pixels emitting light of a third color, wherein the plurality of first pixels and the plurality of second pixels are alternately arranged in a column direction and connected to the first data line, and the plurality of third pixels are repeatedly arranged in the column direction and connected to the second data line.

The data driving circuit may be configured to alternately output first color data and second color data to the first output line in synchronization with an output timing of the first control signal and output third color data to the first output line in synchronization with an output timing of the second control signal during each line time.

The second data line may be spaced apart from the first data line by a two-column interval.

The pixel unit may further include a third data line arranged between the first data line and the second data line, and a plurality of first pixels emitting light of a first color, a plurality of second pixels emitting light of a second color, and a plurality of third pixels emitting light of a third color, wherein the plurality of first pixels and the plurality of second pixels are alternately arranged in a column direction and connected to the first data line and the second data line, and the plurality of third pixels are repeatedly arranged in the column direction and connected to the third data line, and wherein the data distribution circuit may further include a third switch connecting a second output line among the plurality of output lines to the third data line in response to the first control signal.

The data driving circuit may be configured to alternately output first color data and second color data to the first output line in synchronization with an output timing of the first control signal and the second control signal and output third color data to the second output line in synchronization with an output timing of the first control signal during each line time.

The second data line may be spaced apart from the first data line by a three-column interval.

The pixel unit may further include a third data line arranged between the first data line and the second data line, a fourth data line arranged between the third data line and the second data line, a plurality of first pixels repeatedly arranged in a column direction, connected to the first data line, and emitting light of a first color, a plurality of second pixels repeatedly arranged in the column direction, connected to the third data line, and emitting light of a second color, and a plurality of third pixels repeatedly arranged in the column direction, connected to the fourth data line, and emitting light of a third color, and the data distribution circuit may further include a third switch, which connects a second output line among the plurality of output lines to the third data line in response to the first control signal, and a fourth switch, which connects a third output line among the plurality of output lines to the fourth data line in response to the first control signal.

The data driving circuit may be configured to output first color data to the first output line, second color data to the second output line, third color data to the third output line in synchronization with an output timing of the first control signal, and output the first color data to the first output line in synchronization with an output timing of the second control signal.

The pixel unit may further include a plurality of gate lines, each of the plurality of gate lines being arranged in each row, and a gate signal provided to each of the plurality of gate lines may overlap a portion of the first control signal and a portion of the second control signal.

According to one or more embodiments, a display apparatus includes a pixel unit including a plurality of first pixels emitting light of a first color, a plurality of second pixels emitting light of a second color, and a plurality of third pixels emitting light of a third color, wherein the plurality of first pixels and the plurality of second pixels are alternately arranged in a column direction and connected to the a data line, and the plurality of third pixels are repeatedly arranged in the column direction and connected to a second data line, a data driving circuit configured to output data signals through a plurality of output lines, a data distribution circuit connecting the plurality of output lines to the first data line and the second data line in response to a control signal, and a control circuit configured to output the control signal, wherein the first data line and the second data line are alternately arranged in a row direction, the data distribution circuit includes a plurality of demultiplexers selectively connecting each of the plurality of output lines to its corresponding pair of a first data line and a second data line during each line time of one frame, the line time includes a first line time and a second line time subsequent to the first line time, the control circuit is configured to alternately output a first control signal and a second control signal to the plurality of demultiplexers, the first control signal is consecutively output during a second line time of a previous line time and a first line time of a current line time, and the second control signal is consecutively output during a second line time of the current line time and a first line time of a next line time.

The data driving circuit may be configured to alternately output first color data and second color data to the plurality of output lines, respectively, in synchronization with an output timing of the first control signal and output third color data to the plurality of output lines, respectively, in synchronization with an output timing of the second control signal during each line time.

Each of the plurality of demultiplexers may include a first switch, which connects its corresponding output line among the plurality of output lines to the first data line, and a second switch, which connects its corresponding output line to the second data line in response to a second control signal.

The pixel unit may further include a plurality of gate lines, each of the plurality of gate lines being arranged in each row, and a gate signal provided to each of the plurality of gate lines may overlap a portion of the first control signal and a portion of the second control signal.

According to one or more embodiments, a display apparatus includes a pixel unit including a plurality of first pixels emitting light of a first color, a plurality of second pixels emitting light of a second color, and a plurality of third pixels emitting light of a third color, wherein the plurality of first pixels and the plurality of second pixels are alternately arranged in a column direction and connected to a first data line, and the plurality of third pixels are repeatedly arranged in the column direction and connected to a second data line, a data driving circuit configured to output data signals through a plurality of output lines, a data distribution circuit connecting the plurality of output lines to the first data line and the second data line in response to a control signal, and a control circuit configured to output the control signal, wherein the first data line and the second data line are alternately arranged in a row direction, the data distribution circuit includes a first demultiplexer, which selectively connects a first output line among the plurality of output lines to a pair of first data lines during each line time of one frame, and a second demultiplexer, which selectively connects a second output line among the plurality of output lines to a pair of second data lines during each line time of one frame, the line time includes a first line time and a second line time subsequent to the first line time, the control circuit is configured to alternately output a first control signal and a second control signal to the first demultiplexer and the second demultiplexer, respectively, the first control signal is consecutively output during a second line time of a previous line time and a first line time of a current line time, and the second control signal is consecutively output during a second line time of the current line time and a first line time of a next line time.

The data driving circuit may be configured to alternately output first color data and second color data to a plurality of first output lines in synchronization with output timings of the first control signal and the second control signal and output third color data to a plurality of second output lines in synchronization with the output timings of the first control signal and the second control signal during each line time.

The first demultiplexer may include a pair of switches respectively connecting the first output line to the pair of first data lines, and the second demultiplexer includes a pair of switches respectively connecting the second output line to the pair of second data lines.

The pixel unit may further include a plurality of gate lines, each of the plurality of gate lines being arranged in each row, and a gate signal provided to each of the plurality of gate lines may overlap a portion of the first control signal and a portion of the second control signal.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
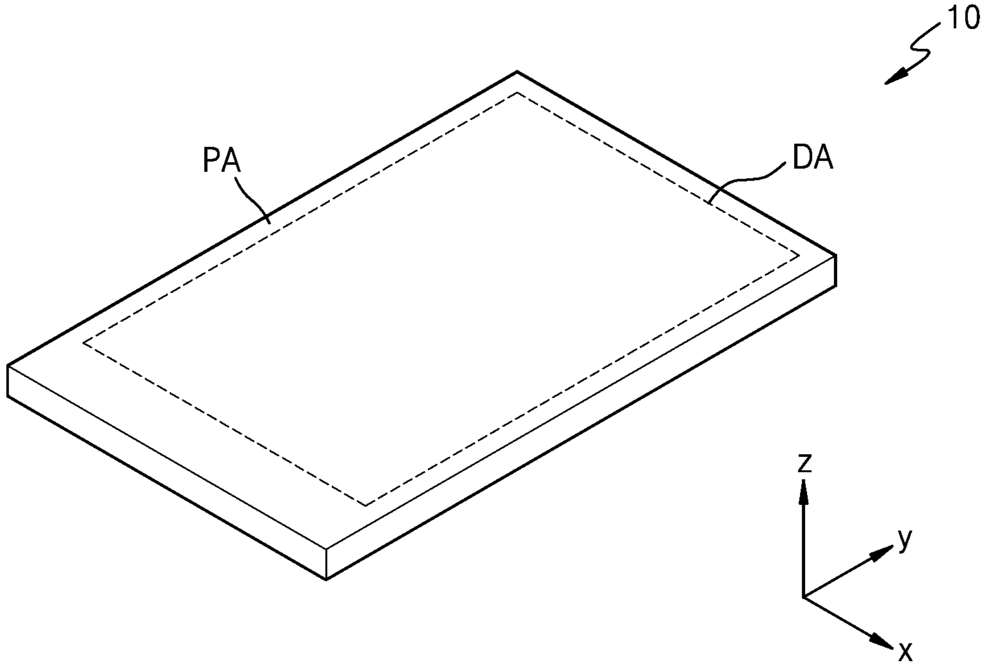
FIG. 1 is a schematic perspective view of a display apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b, or c" indicates only a, only b, only c, both a and b, both a and c, both b and c, all of a, b, and c, or variations thereof.

As the disclosure allows for various changes and numerous embodiments, particular embodiments will be illustrated in the drawings and described in detail in the written description. The attached drawings for illustrating preferred embodiments of the disclosure are referred to in order to gain a sufficient understanding of the disclosure, the merits thereof, and the objectives accomplished by the implementation of the disclosure. The disclosure may, however, be embodied in many different forms and should not be construed as being limited to the embodiments set forth herein.

While such terms as "first," "second," etc., may be used to describe various elements, such elements are not limited to the above terms, and the above terms are used only to distinguish one element from another.

As used herein, the singular forms "a," "an" and "the" are intended to include the plural forms as well, unless the context clearly indicates otherwise.

It will be further understood that the terms "comprises" and/or "comprising" used herein specify the presence of stated features or elements, but do not preclude the presence or addition of one or more other features or elements.

It will be understood that when a layer, region, or element is referred to as being "formed on" another layer, region, or element, it can be directly or indirectly formed on the other layer, region, or element. That is, for example, intervening layers, regions, or elements may be present.

Sizes of elements in the drawings may be exaggerated for convenience of explanation. In other words, since sizes and thicknesses of elements in the drawings are arbitrarily illustrated for convenience of explanation, the following embodiments are not limited thereto.

In the present embodiment, an expression such as "A and/or B" indicates A, B, or A and B. Also, an expression such as "at least one of A and B" indicates A, B, or A and B.

In embodiments below, when a wire is referred to as "extending in a first direction or a second direction," the wire may extend in a straight line or extend in a zigzag form or in a curve in the first direction or the second direction.

In embodiments below, the expression "in a plan view" may indicate that an object is viewed from the top, and the expression "in a cross-sectional view" may indicate that a cross-section of a target portion, which is vertically cut, is viewed from the side. In the following embodiments, when a first element "overlaps" a second element, the first element may be arranged on or under the second element.

It will be understood that when X is connected to Y, X may be electrically connected, functionally connected, or directly connected to Y. Here, X and Y may each be an object (e.g., an apparatus, a device, a circuit, a wire, an electrode, a terminal, a conductive layer, a layer, or the like). Therefore, a connection relationship between X and Y is not limited to a certain connection relationship, e.g., a connection relationship illustrated in the drawings or stated in the detailed description, and may include relationships other than the connection relationship in the drawings or detailed description.

When X is electrically connected to Y, there may be, for example, between X and Y, at least one device (e.g., a switch, a transistor, a capacitor device, an inductor, a resistor, a diode, or the like), which enables an electrical connection between X and Y.

In embodiments below, the term "on" used in relation to a device state may indicate an activation state of the device, and the term "off" may indicate an inactivation state of the device. The term "on" used in relation to a signal received by a device may indicate a signal for activating a device, and the term "off" may indicate a signal for inactivating the device. The device may be activated according to a high-level voltage or a low-level voltage. For example, a P-channel transistor may be activated according to a low-level voltage, and an N-channel transistor may be activated according to a high-level voltage. Therefore, "on" voltages of a P-channel transistor (a P-type transistor) and an N-channel transistor (an N-type transistor) are opposite voltage levels (low vs. high).

FIG. 1 is a schematic perspective view of a display apparatus according to an embodiment. Referring to FIG. 1, a display apparatus 10 may include a display area DA, where images are displayed, and a peripheral area PA which is the periphery of the display area DA. The display apparatus 10 may provide a certain image by using light emitted from pixels arranged in the display area DA. The peripheral area PA is arranged around the display area DA and may be a non-display area where no pixels are arranged. The display area DA may be entirely surrounded by the peripheral area PA. In the peripheral area PA, various lines configured to transmit electrical signals to be applied to the display area DA, and pads, to which a printed circuit board or a driver IC chip is attached, may be arranged.

Figure 2:
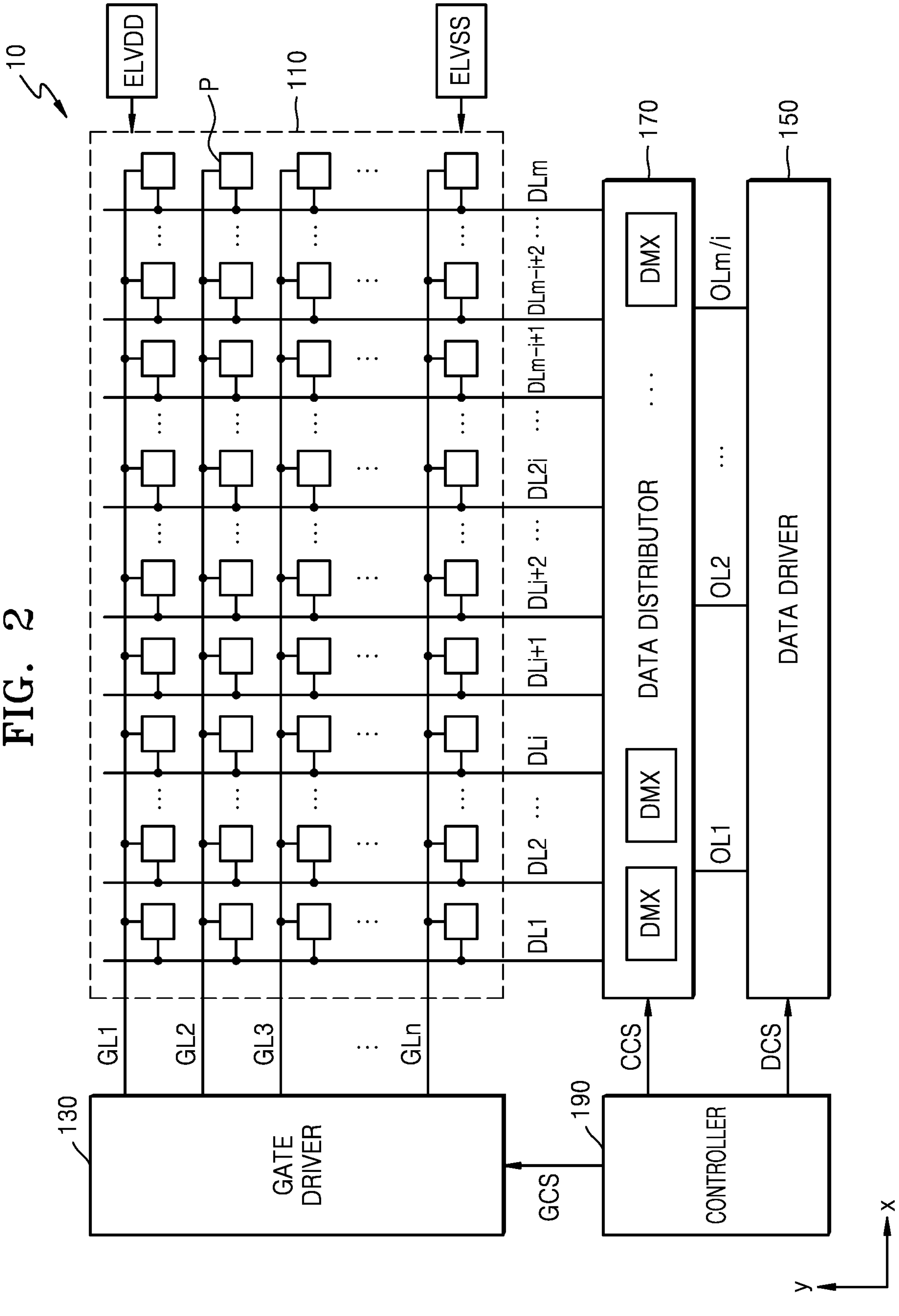
FIG. 2 is a schematic plan view of a display apparatus according to an embodiment.

FIG. 2 is a schematic plan view of a display apparatus according to an embodiment. Referring to FIG. 2, the display apparatus 10 may include a pixel unit 110, a gate driver (a gate driving circuit) 130, a data driver (a data driving circuit) 150, a data distributor (a data distribution circuit) 170, and a controller (a control circuit) 190.

The pixel unit 110 in which pixels P are arranged may be in the display area DA. In the peripheral area PA, the gate driver 130, the data driver 150, the data distributor 170, and the controller 190 may be arranged.

Each of the pixels P may be connected to its corresponding one of gate lines GL1 to GLn and its corresponding one of data lines DL1 to DLm. Each of the gate lines GL1 to GLn may respectively extend in a first direction (e.g., an x direction or a row direction) and be connected to the pixels P arranged in the same rows. Each of the gate lines GL1 to GLn may be configured to respectively transmit gate signals to the pixels P in the same rows. Each of the data lines DL1 to DLm may respectively extend in a second direction (e.g., a y direction or a column direction) and be connected to the pixels P arranged in the same column.

The gate driver 130 may be connected to the gate lines GL1 to GLn, generate gate signals in response to a gate driving control signal GCS from the controller 190, and sequentially provide the gate signals to the gate lines GL1 to GLn. When the gate signals are sequentially provided to the gate lines GL1 to GLn, the pixels P may be selected in units of rows. Each of the data lines DL1 to DLm may be configured to respectively transmit data signals DATA to the pixels P arranged in selected row. A gate line may be connected to a gate of a transistor included in the pixel P. A gate signal may be a gate control signal that controls turning on and off of the transistor connected to the gate line. The gate signal may be a square wave signal in which an on voltage for turning on the transistor and an off voltage for turning off the transistor are repeated.

The data driver 150 may be connected to output lines OL1 to OLm/i, and the output lines OL1 to OLm/i may be connected to the data lines DL1 to DLm through the data distributor 170. The data driver 150 may convert an image signal into a data signal in the form of a voltage or a current, in response to a data driving control signal DCS that is input from the controller 190. The data driver 150 may provide the data signal to the data distributor 170 through the output lines OL1 to OLm/i.

The data distributor 170 may be connected between the output lines OL1 to OLm/i and the data lines DL1 to DLm. The data distributor 170 may include m/i (where, i is a natural number equal to or greater than 2) demultiplexers DMX including switches. That is, the data distributor 170 may include the demultiplexers DMX of which the number is equal to the number of output lines. An end of the demultiplexer DMX may be connected to one of the output lines OL1 to OLm/i corresponding to the demultiplexer DMX. The other end of the demultiplexer DMX may be connected to i data lines. The demultiplexer DMX may provide i data lines with data signals provided from a corresponding output line. Because fewer output lines are required than data lines as the demultiplexer DMX is used, the number of output lines connected to the data driver 150 is reduced, thus decreasing manufacturing costs. The demultiplexer DMX may include a plurality of switches. Each of switches is connected to their corresponding output line and a corresponding one of i data lines.

The controller 190 may generate the data driving control signal DCS and the gate driving control signal GCS in response to synchronization signals provided from the outside. The controller 190 may output the data driving control signal DCS to the data driver 150 and the gate driving control signal GCS to the gate driver 130. The controller 190 may output a distribution control signal CCS to the data distributor 170, and the data distributor 170 may selectively connect the output lines OL1 to OLm/i to the data lines DL1 to DLm in response to the distribution control signal CCS. The controller 190 may respectively output i distribution control signals CCS to the demultiplexers DMX to allow i data signals, which are provided to one output line, to be provided to i data lines in a time-sharing manner. The i distribution control signals CCS may be sequentially output so as not to overlap each other.

The gate driver 130, the data distributor 170, and the controller 190 may be directly formed on a substrate. The data driver 150 may be arranged on a Flexible Printed Circuit Board (FPCB) electrically connected to pads that are on one side of the substrate. In another embodiment, the data driver 150 may be directly arranged on the substrate in a Chip On Glass (COG) manner or a Chip On Plastic (COP) manner.

When the display apparatus 10 is an organic light-emitting display apparatus, a first power voltage (or a driving voltage) ELVDD and a second power voltage ELVSS may be provided to the pixels P of the display apparatus 10. The first power voltage ELVDD may be a high-level voltage provided to a first electrode (a pixel electrode or an anode) of a display element (a light-emitting diode) included in each pixel P. The second power voltage ELVSS may be a low-level voltage provided to a second electrode (an opposite electrode or a cathode) of the display element included in each pixel P. The first power voltage ELVDD and the second power voltage ELVSS may each be a driving voltage to make the pixels P emit light.

Hereinafter, a case where the display apparatus 10 is an organic light-emitting display apparatus is described, but the display apparatus is not limited thereto. In another embodiment, the display apparatus 10 may be a display apparatus such as an inorganic light-emitting display apparatus (or an inorganic EL display apparatus) or a quantum dot light-emitting display apparatus.

Figure 3A:
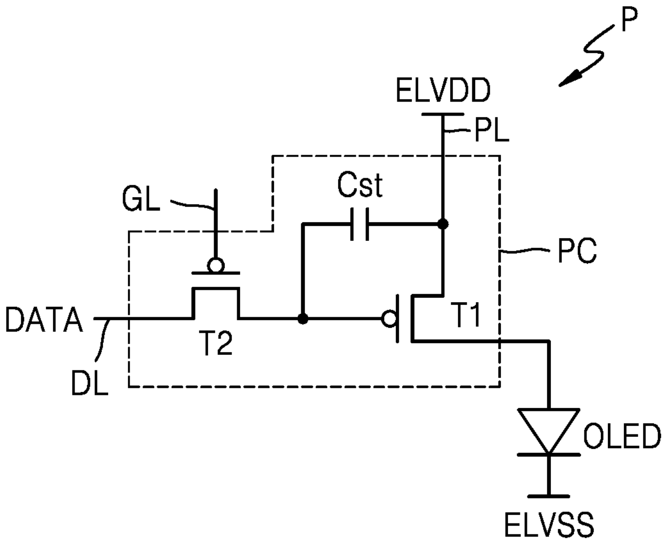
FIGS. 3A, 3B, and 3C are circuit diagrams of a pixel according to an embodiment.
Figure 3B:
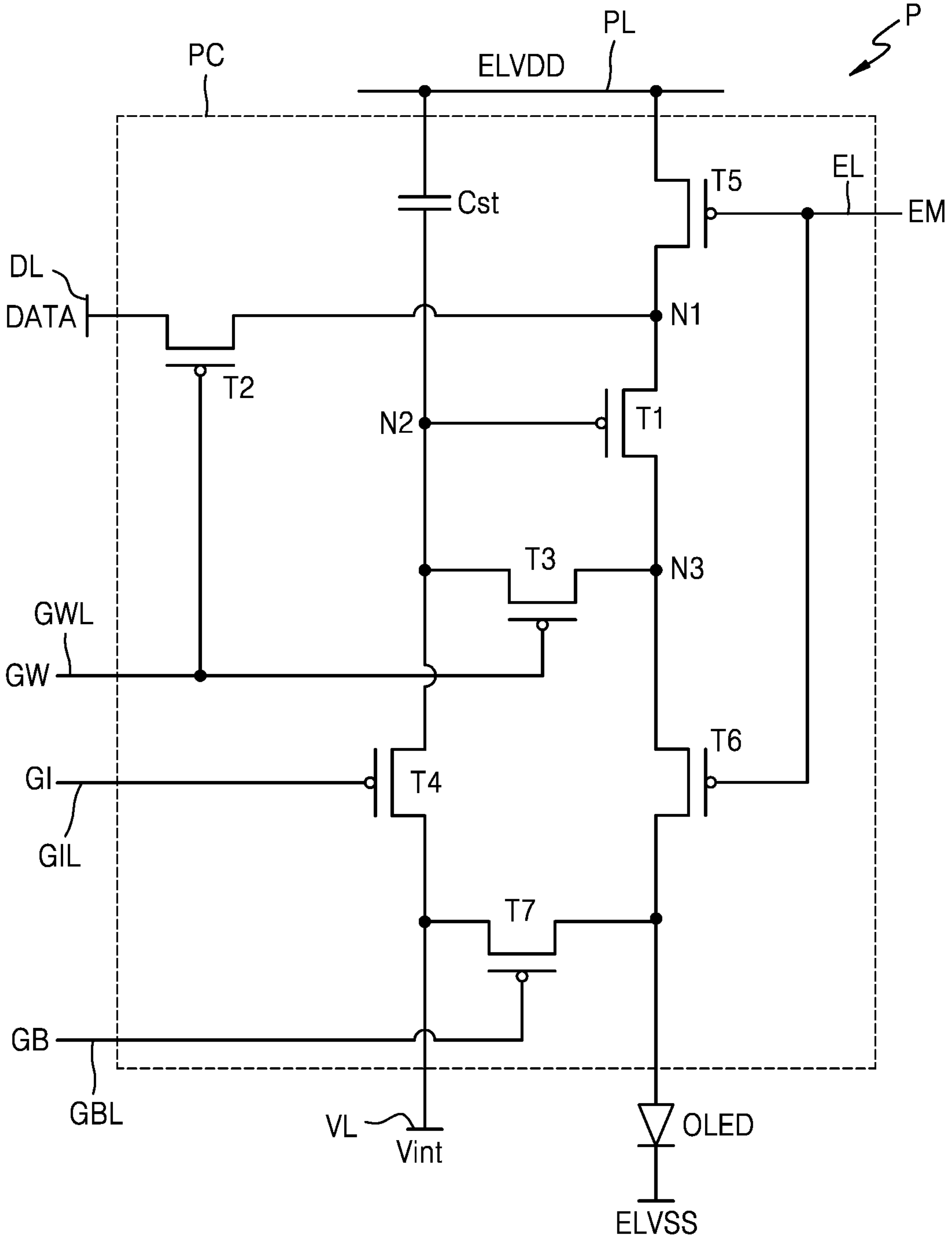
Figure 3C:
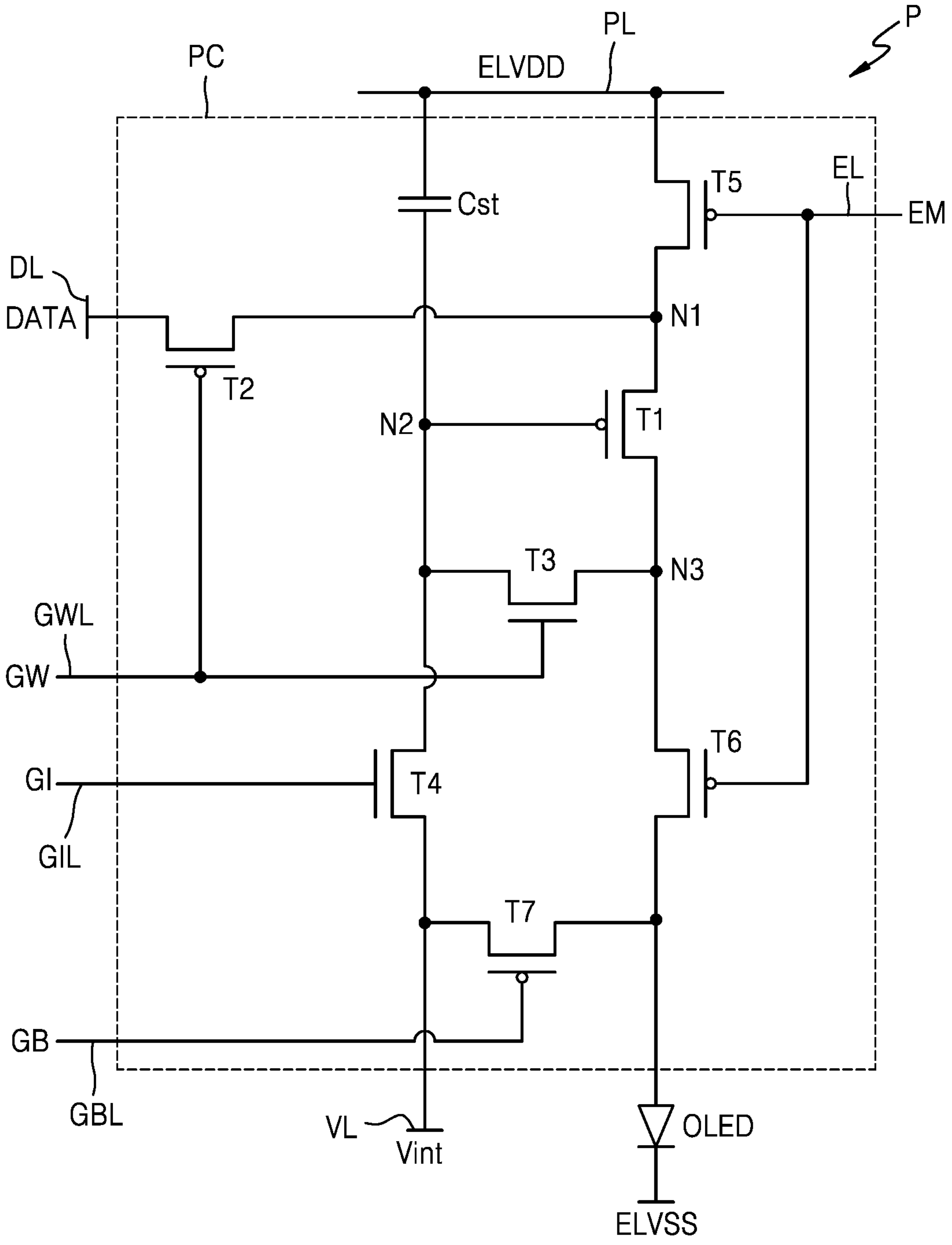

FIGS. 3A, 3B, and 3C are circuit diagrams of a pixel according to an embodiment.

Referring to FIG. 3A, a pixel circuit PC may be connected to a light-emitting diode, and thus, the pixel P may emit light. The light-emitting diode may be an organic light-emitting diode OLED. The pixel circuit PC may include a first transistor T1 that is a driving transistor, a second transistor T2 that is a switching transistor, and a capacitor Cst. The second transistor T2 may be connected to a gate line GL and a data line DL and configured to transmit a data signal DATA, which is input through the data line DL, to the first transistor T1 in response to a gate signal that is input through the gate line GL.

The capacitor Cst may be connected to the second transistor T2 and a driving power line PL and configured to store a voltage corresponding to a difference between a voltage transmitted from the switching transistor T2 and the first power voltage ELVDD provided to the driving power line PL.

The first transistor T1 may be connected to the driving power line PL and the capacitor Cst and configured to control a driving current flowing in the organic light-emitting diode OLED from the driving power line PL according to the voltage stored in the capacitor Cst. The organic light-emitting diode OLED may emit light having a brightness corresponding to the driving current.

FIG. 3A shows that the pixel circuit PC includes two thin-film transistors and one capacitor, but one or more embodiments are not limited thereto.

Referring to FIG. 3B, the pixel circuit PC includes a first transistor T1 to a seventh transistor T7, and according to types (a P-type or an N-type) and/or operation conditions of transistors, a first terminal of each of the first transistor T1 to the seventh transistor T7 may be a source or a drain, and a second terminal thereof may be different from the first terminal. For example, when the first terminal is a source, the second terminal may be a drain. The first transistor T1 may be a driving transistor in which a magnitude of a source-drain current is determined according to a gate-source voltage Vgs, and the second transistor T2 to the seventh transistor T7 may each be a switching transistor that is turned on/off according to the gate-source voltage, that is, substantially, a gate voltage.

The pixel circuit PC may be connected to a first gate line GWL configured to transmit a first gate signal GW, a second gate line GIL configured to transmit a second gate signal GI, a third gate line GBL configured to transmit a third gate signal GB, an emission control line EL configured to transmit an emission control signal EM, a data line DL configured to transmit a data signal DATA, a driving power line PL configured to transmit a driving voltage ELVDD, and an initialization voltage line VL configured to transmit an initialization voltage Vint.

The first transistor T1 may include a gate connected to a second node N2, a first terminal connected to a first node N1, and a second terminal connected to a third node N3. The first transistor T1 may receive the data signal DATA according to a switching operation of the second transistor T2 and may be configured to provide a driving current to the light-emitting diode. The light-emitting diode may be an organic light-emitting diode OLED.

The second transistor T2 (a data write transistor) may include a gate connected to the first gate line GWL, a first terminal connected to the data line DL, and a second terminal connected to the first node N1. The second transistor T2 may be turned on in response to the first gate signal GW transmitted through the first gate line GWL and perform a switching operation whereby the data signal DATA transmitted through the data line DL is transmitted to the first node N1.

The third transistor T3 (a compensation transistor) may include a gate connected to the first gate line GWL, a first terminal connected to the second node N2, and a second terminal connected to the third node N3. The third transistor T3 may be turned on in response to the first gate signal GW transmitted through the first gate line GWL and diode-connect the first transistor T1.

The fourth transistor T4 (a first initialization transistor) may include a gate connected to the second gate line GIL, a first terminal connected to an initialization voltage line VL, and a second terminal connected to the second node N2. The fourth transistor T4 may be turned on in response to the second gate signal GI transmitted through the second gate line GIL and initialize a gate voltage of the first transistor T1 by transmitting the initialization voltage Vint to the gate of the first transistor T1.

The fifth transistor T5 (a first emission control transistor) may include a gate connected to the emission control line EL, a first terminal connected to the driving power line PL, and a second terminal connected to the first node N1. The sixth transistor T6 (a second emission control transistor) may include a gate terminal connected to the emission control line EL, a first terminal connected to the third node N3, and a second terminal connected to a pixel electrode of the organic light-emitting diode OLED. The fifth transistor T5 and the sixth transistor T6 may be simultaneously turned on in response to the emission control signal EM transmitted through the emission control line EL, and thus, the driving current may flow in the organic light-emitting diode OLED.

The seventh transistor T7 (a second initialization transistor) may include a gate connected to the third gate line GBL, a first terminal connected to the second terminal of the sixth transistor T6 and the pixel electrode of the organic light-emitting diode OLED, and a second terminal connected to the initialization voltage line VL. The seventh transistor T7 may be turned on in response to a third gate signal GB transmitted through the third gate line GBL and initialize a voltage of the pixel electrode of the organic light-emitting diode OLED by transmitting the initialization voltage Vint to the pixel electrode of the organic light-emitting diode OLED. The seventh transistor T7 may be omitted.

The capacitor Cst may include a first electrode connected to the second node N2 and a second electrode connected to the driving power line PL.

The organic light-emitting diode OLED may include the pixel electrode and a common electrode facing the same, and the common electrode may receive the second power voltage ELVSS. The organic light-emitting diode OLED may emit light of a certain color by receiving the driving current from the first transistor T1, and thus, images may be displayed.

FIGS. 3A and 3B show that transistors of the pixel circuit are P-type transistors, but one or more embodiments are not limited thereto. Various modifications may be made. For example, the transistors of the pixel circuit may each be an N-type transistor, or as shown in FIG. 3C, some of the transistors may be P-type transistors, and the others thereof may be N-type transistors. In an embodiment, the third transistor T3 and the fourth transistor T4 of the pixel circuit of FIG. 3C may each be an N-type transistor, and the others thereof may each be a P-type transistor. The pixel circuits of FIGS. 3A, 3B, and 3C are merely examples, and the pixel circuit of the pixel P may be in various forms.

Figure 4:
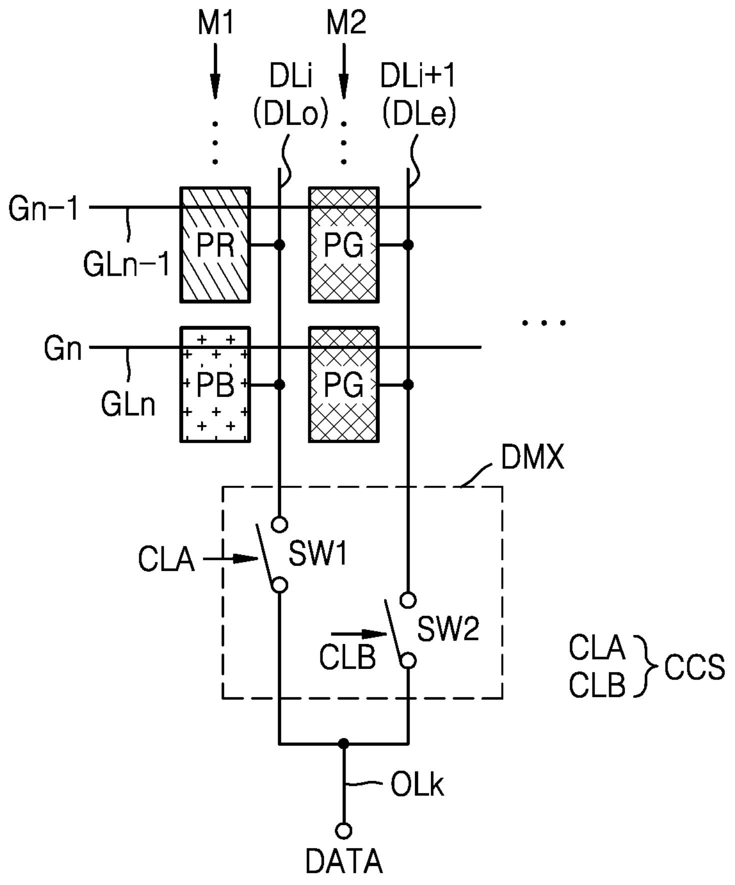
FIG. 4 is a diagram including a demultiplexer according to an embodiment.

FIG. 4 is a diagram including a demultiplexer according to an embodiment. FIG. 4 shows an example of a demultiplexer DMX that selectively connects a $k^{th}$ output line OLk to a pair of $i^{th}$ data line DLi and an $(i+1)^{th}$ data line DLi+1 that are adjacent to each other. The demultiplexer DMX may include a first switch SW1 and a second switch SW2.

The first switch SW1 may be arranged between the $k^{th}$ output line OLk and the $i^{th}$ data line DLi. The first switch SW1 may connect the $k^{th}$ output line OLk to the $i^{th}$ data line DLi in response to a first control signal CLA and may apply the data signal DATA, which is applied to the $k^{th}$ output line OLk, to the $i^{th}$ data line DLi.

The second switch SW2 may be arranged between the $k^{th}$ output line OLk and the $(i+1)^{th}$ data line DLi+1. The second switch SW2 may connect the $k^{th}$ output line OLk to the $(i+1)^{th}$ data line DLi+1 in response to a second control signal CLB and may apply the data signal DATA, which is applied to the $k^{th}$ output line OLk, to the $(i+1)^{th}$ data line DLi+1.

The distribution control signal CCS may include the first control signal CLA and the second control signal CLB. The first control signal CLA and the second control signal CLB may be alternately applied at different timings so as not to overlap each other.

The pixels P may include a first pixel PR, a second pixel PB, and third pixels PG that emit different colors of light. In an embodiment, the first pixel PR and the second pixel PB may be alternately arranged in a column M1 in which the $i^{th}$ data line DLi is arranged, and may be connected to the $i^{th}$ data line DLi. In a column M2 in which the $(i+1)^{th}$ data line DLi+1 is arranged, the third pixels PG are repeatedly arranged, and the third pixels PG may be connected to the $(i+1)^{th}$ data line DLi+1. One of the $i^{th}$ data line DLi and the $(i+1)^{th}$ data line DLi+1 may be an odd data line DLo, and the other thereof may be an even data line DLe. FIG. 4 shows an example in which the $i^{th}$ data line DLi is an odd data line DLo and the $(i+1)^{th}$ data line DLi+1 is an even data line DLe. A pair of data lines connected to the demultiplexer DMX may be a pair of an odd data line and an even data line that are spaced apart from each other by one column interval. The first pixel PR may be a red pixel emitting red light, the second pixel PB may be a blue pixel emitting blue light, and the third pixel PG may be a green pixel emitting green light.

FIG. 4 shows pixels P connected to an $(n-1)^{th}$ gate line GLn−1 arranged in an $(n-1)^{th}$ row and an $n^{th}$ gate line GLn arranged in an $n^{th}$ row. The $(n-1)^{th}$ gate line GLn−1 and the $n^{th}$ gate line GLn of FIG. 4 may be the gate line GL of FIG. 3A or the first gate line GWL of FIGS. 3B and 3C.

Figure 5:
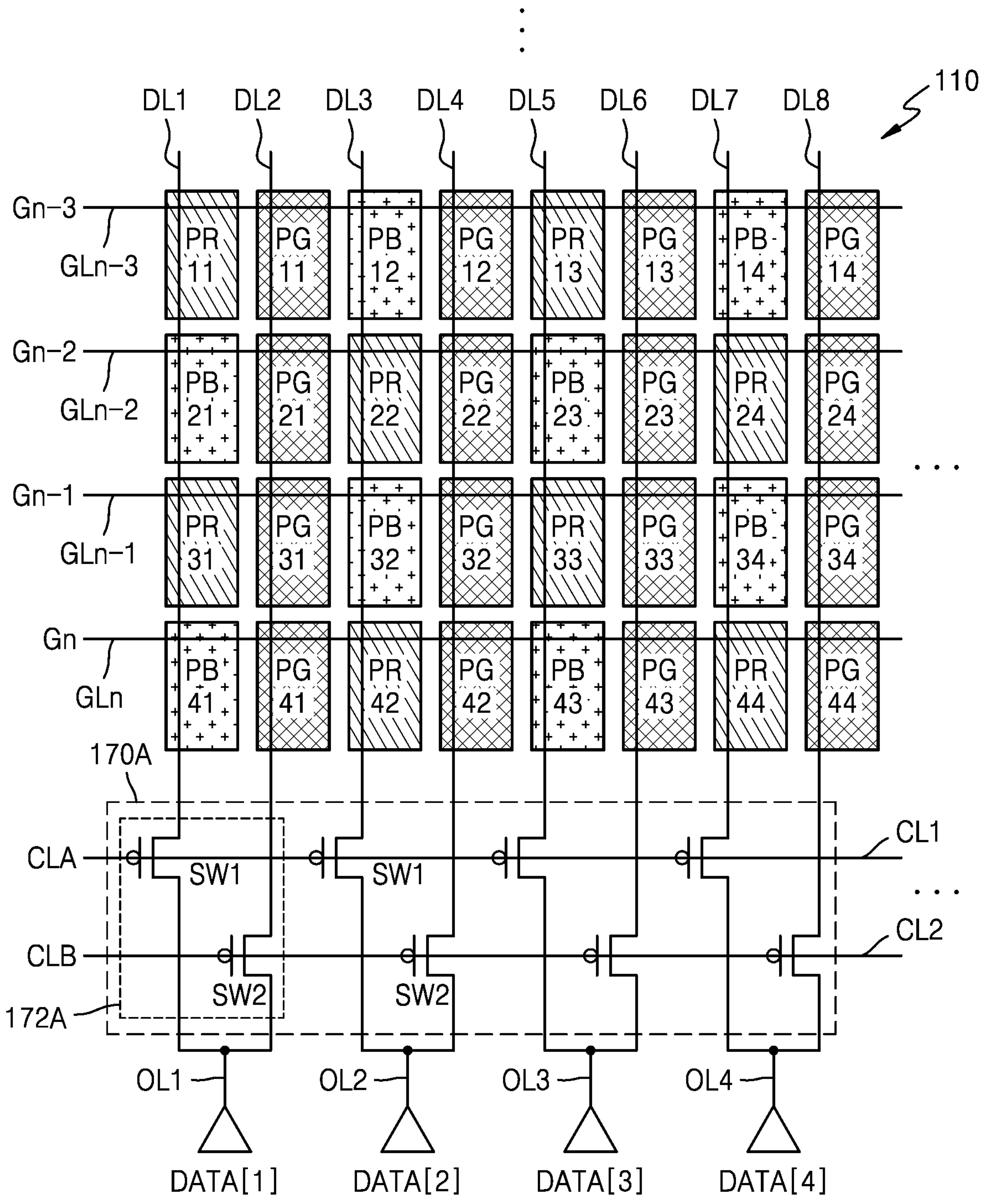
FIG. 5 is a diagram including a demultiplexer according to an embodiment.
Figure 6:
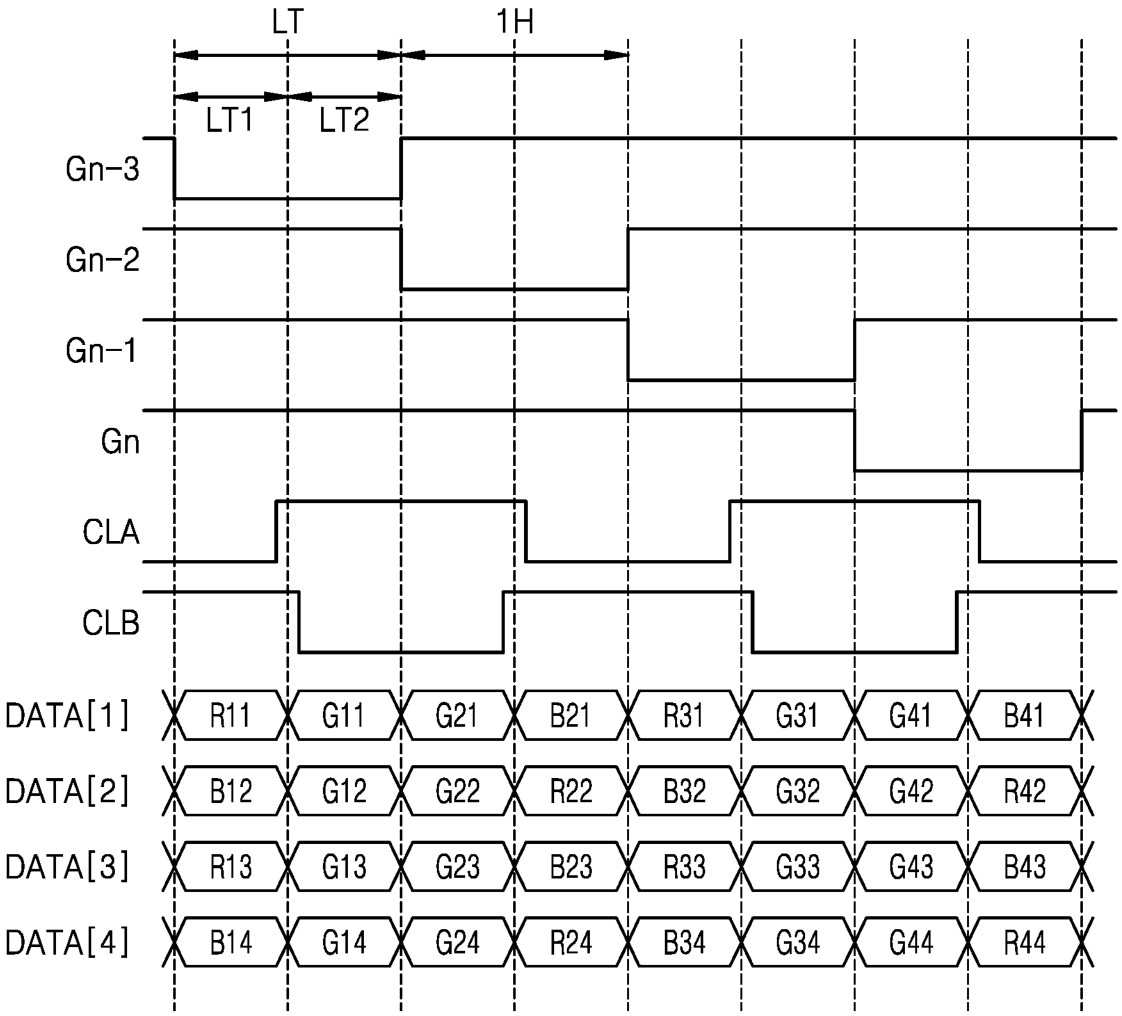
FIG. 6 is a timing diagram of an operation of the demultiplexer of FIG. 5.

FIG. 5 is a diagram including a demultiplexer according to an embodiment. FIG. 6 is a timing diagram of an operation of the demultiplexer of FIG. 5. The demultiplexer of FIG. 5 is an example to which the demultiplexer of FIG. 4 is applied.

Referring to FIG. 5, a data distributor 170A may include demultiplexers 172A, and the pixel unit 110 may include the pixels P.

In the pixel unit 110, columns in which the first pixels PR and the second pixels PB are alternately arranged and columns in which the third pixels PG are repeatedly arranged may be alternately arranged in a row direction. In the pixel unit 110, gate lines and data lines may be arranged. In an embodiment, the gate lines may be the gate lines GL of FIG. 3A or the first gate line GWL of FIGS. 3B and 3C. FIG. 5 shows gate lines GLn−3 to GLn in an $(n-3)^{th}$ row to an $n^{th}$ row and data lines DL1 to DL8 in a first column to an eighth column for convenience of explanation. The data lines may include odd data lines (e.g., the data lines DL1, DL3, DL5, DL7, . . . ) and even data lines (e.g., the data lines DL2, DL4, DL6, DL8, . . . ). A pair of data lines connected to the demultiplexer 172A may be a pair of odd and even data lines. Hereinafter, the demultiplexer 172A connected to the first output line OL1 is described as an example, and the same descriptions may be applied to the demultiplexers 172A connected to other output lines such as OL2, OL3, and OL4 etc.

The demultiplexer 172A may include the first switch SW1 and the second switch SW2.

The first switch SW1 may be arranged between the first output line OL1 and the first data line DL1 such that one end of the first switch SW1 is connected to the first output line OL1, and the other end of the first switch SW1 is connected to the first data line DL1. The first switch SW1 may be a transistor that includes a gate connected to a first control line CL1, a first terminal connected to the first output line OL1, and a second terminal connected to the first data line DL1. The first switch SW1 may be turned on in response to the first control signal CLA applied from the first control line CL1, connect the first output line OL1 to the first data line DL1, and apply a data signal DATA[1], which is applied to the first output line OL1, to the first data line DL1.

The second switch SW2 may be arranged between the first output line OL1 and the second data line DL2 such that one end of the second switch SW2 is connected to the first output line OL1, and the other end of the second switch SW2 is connected to the second data line DL2. The second switch SW2 may be a transistor that includes a gate connected to a second control line CL2, a first terminal connected to the first output line OL1, and a second terminal connected to the second data line DL2. The second switch SW2 may be turned on in response to the second control signal CLB applied from the second control line CL2, connect the first output line OL1 to the second data line DL2, and apply the data signal DATA[1], which is applied to the first output line OL1, to the second data line DL2.

The data signal DATA[1] may include a first data signal R applied to the first pixel PR, a second data signal B applied to the second pixel PB, and a third data signal G applied to the third pixel PG.

FIG. 6 shows a sequence of data signals applied by a data driver to pixels through output lines. Hereinafter, a supply of an arbitrary signal may indicate that an on-voltage of a signal is supplied.

Referring to FIG. 6, the first control signal CLA and the second control signal CLB may be provided from the controller 190 (see FIG. 2) to the demultiplexer 172A through the first control line CL1 and the second control line CL2. The first control signal CLA and the second control signal CLB may be gate control signals that control turning on and off of the first switch SW1 and the second switch SW2 of the demultiplexer 172A. The first control signal CLA and the second control signal CLB may be square wave signals in which on voltages for turning on the first switch SW1 and the second switch SW2 and off voltages for turning off the first switch SW1 and the second switch SW2 are repeated. In an embodiment, the on-voltages of the first control signal CLA and the second control signal CLB may be low-level voltages (first-level voltages), and the off-voltages thereof may be high-level voltages (second-level voltages).

The first control signal CLA and the second control signal CLB may be signals having the same waveform and shifted phases. For example, the second control signal CLB may have the same waveform as the first control signal CLA and then may be applied after the phase of the second control signal CLB is shifted (phase-delayed) by certain intervals (e.g., one horizontal cycle (1H)). The timing at which voltage levels of the first control signal CLA and the second control signal CLB are inverted may be substantially the same. A period (hereinafter, referred to as an 'on-voltage period') in which the on-voltage of the first control signal CLA is maintained and a period (hereinafter, referred to as an 'off-voltage period') in which the off-voltage of the first control signal CLA is maintained may overlap an off-voltage period and an on-voltage period of the second control signal CLB, respectively. The on-voltage periods of the first control signal CLA and the second control signal CLB may be approximately 1H. 1H may be a time required to scan the pixels P in one row (one gate line) in the display apparatus 10 to write the data signal DATA to the pixels P.

In one frame, gate signals . . . , Gn−3, Gn−2, Gn−1, and Gn may be sequentially provided from the gate driver 130 (see FIG. 2) through gate lines . . . , GLn−3, GLn−2, GLn−1, and GLn. The gate signals . . . , Gn−3, Gn−2, Gn−1, and Gn may be gate control signals that control turning on and off of a data write transistor (e.g., the second transistor T2). The gate signals . . . , Gn−3, Gn−2, Gn−1, and Gn may be provided as an on-voltage, at which the data write transistor may be turned on, and an off-voltage, at which the data write transistor may be turned off. In an embodiment, the on-voltages of the gate signals . . . , Gn−3, Gn−2, Gn−1, and Gn may be low-level voltages (first-level voltages), and the off-voltages thereof may be high-level voltages (second-level voltages).

An on-voltage period of the gate signals . . . , Gn−3, Gn−2, Gn−1, and Gn may be referred to as a line time LT. The line time LT may be time required to write the data signal DATA to the pixels P in one row (one line) in the display apparatus 10. In an embodiment, the line time LT may be approximately 1 H. The line time LT may include a first line time LT1 and a second line time LT2 subsequent to the first line time LT1. During each line time LT, the first control signal CLA and the second control signal CLB may be alternately provided. Thus, two pixels P arranged in a same row may receive different data signals DATA in response to the first control signal CLA and the second control signal CLB during 1H.

The first control signal CLA or the second control signal CLB may be provided during the first line time LT1 of a line time of a row to which a gate signal is provided (hereinafter, referred to as a 'current line time'), and the second control signal CLB or the first control signal CLA may be provided during the second line time LT2 of the line time. For example, when a line time when the $(n-1)^{th}$ gate signal Gn−1 is provided is referred to as a current line time, a line time when the (n−2)$^{th}$ gate signal Gn−2 is provided is referred to as a previous line time, and a line time when the n$^{th}$ gate signal Gn is provided is referred to as a next line time, the first control signal CLA may be consecutively provided during a second line time of the previous line time and a first line time of the current line time, and the second control signal CLB may be consecutively provided during a second line time of the current line time and a first line time of the next line time.

The data driver 150 (see FIG. 2) may be synchronized with gate signals and provide the data signals DATA to the output lines, respectively.

For example, when the (n−3)$^{th}$ gate signal Gn−3 is provided to the (n−3)$^{th}$ gate line GLn−3 during the line time LT, pixels PR11, PG11, PB12, PG12, PR13, PG13, PB14, PG14, . . . connected to the (n−3)$^{th}$ gate signal Gn−3 may be selected, and the data driver 150 may output data signals DATA[1], DATA[2], DATA[3], DATA[4], . . . to output lines OL1, OL2, OL3, OL4, . . . . In this case, the first control signal CLA may be provided to the first switches SW1 of the demultiplexers 172A during the first line time LT1, and the second control signal CLB may be provided to the second switches SW2 of the demultiplexers 172A during the second line time LT2. Accordingly, during the first line time LT1, data signals R11, B12, R13, B14, . . . may be provided to pixels PR11, PB12, PR13, PB14, . . . connected to the data lines DL1, DL3, DL5, DL7, . . . connected to the first switches SW1 from among the pixels PR11, PG11, PB12, PG12, PR13, PG13, PB14, PG14, . . . connected to the (n−3)$^{th}$ gate line GLn−3. During the second line time LT2, data signals G11, G12, G13, G14, . . . may be provided to pixels PG11, PG12, PG13, PG14, . . . connected to the data lines DL2, DL4, DL6, DL8, . . . connected to the second switches SW2 from among the pixels PR11, PG11, PB12, PG12, PR13, PG13, PB14, PG14, . . . connected to the (n−3)$^{th}$ gate line GLn−3.

And then, when the (n−2)$^{th}$ gate signal Gn−2 is provided to the (n−2)$^{th}$ gate line GLn−2 during the line time LT, pixels PB21, PG21, PR22, PG22, PB23, PG23, PR24, PG24, . . . connected to the (n−2)$^{th}$ gate line GLn−2 may be selected, and the data driver 150 may output the data signals DATA[1], DATA[2], DATA[3], DATA[4], . . . to the output lines OL1, OL2, OL3, OL4, . . . . In this case, the second control signal CLB may be provided to the second switches SW2 of the demultiplexers 172A during the first line time LT1, and the first control signal CLA may be provided to the first switches SW1 of the demultiplexers 172A during the second line time LT2. Accordingly, during the first line time LT1, data signals G21, G22, G23, G24, . . . may be provided to pixels PG21, PG22, PG23, PG24, . . . connected to the data lines DL2, DL4, DL6, DL8, . . . connected to the second switch SW2 from among the pixels PB21, PG21, PR22, PG22, PB23, PG23, PR24, PG24, . . . connected to the (n−2)$^{th}$ gate line GLn−2. During the second line time LT2, data signals B21, R22, B23, R24, . . . may be provided to pixels PB21, PR22, PB23, PR24, . . . connected to the data lines DL1, DL3, DL5, DL7, . . . connected to the first switch SW1 from among the pixels PB21, PG21, PR22, PG22, PB23, PG23, PR24, PG24, . . . connected to the (n−2)$^{th}$ gate line GLn−2.

Then, when the (n−1)$^{th}$ gate signal Gn−1 is provided to the (n−1)$^{th}$ gate line GLn−1 during the line time LT, pixels PR31, PG31, PB32, PG32, PR33, PG33, PB34, PG34, . . . connected to the (n−1)$^{th}$ gate line GLn−1 may be selected, and the data driver 150 may output the data signals DATA[1], DATA[2], DATA[3], DATA[4], . . . to the output lines OL1, OL2, OL3, OL4, . . . . In this case, the first control signal CLA may be provided to the first switches SW1 of the demultiplexers 172A during the first line time LT1, and the second control signal CLB may be provided to the second switches SW2 of the demultiplexers 172A during the second line time LT2. Accordingly, during the first line time LT1, data signals R31, B32, R33, B34, . . . may be provided to pixels PR31, PB32, PR33, PB34, . . . connected to the data lines DL1, DL3, DL5, DL7, . . . connected to the first switch SW1 from among the pixels PR31, PG31, PB32, PG32, PR33, PG33, PB34, PG34, . . . connected to the (n−1)$^{th}$ gate line GLn−1. Then, during the second line time LT2, data signals G31, G32, G33, G34, . . . may be provided to pixels PG31, PG32, PG33, PG34, . . . connected to the data lines DL2, DL4, DL6, DL8, . . . connected to the second switch SW2 from among the pixels PR31, PG31, PB32, PG32, PR33, PG33, PB34, PG34, . . . connected to the (n−1)$^{th}$ gate line GLn−1.

Next, when the n$^{th}$ gate signal Gn is provided to the n$^{th}$ gate line GLn during the line time LT, pixels PB41, PG41, PR42, PG42, PB43, PG43, PR44, PG44, . . . connected to the n$^{th}$ gate line GLn may be selected, and the data driver 150 may output the data signals DATA[1], DATA[2], DATA[3], DATA[4], . . . to the output lines OL1, OL2, OL3, OL4, . . . . In this case, the second control signal CLB may be provided to the second switches SW2 of the demultiplexers 172A during the first line time LT1, and the first control signal CLA may be provided to the first switches SW1 of the demultiplexers 172A during the second line time LT2. Accordingly, during the first line time LT1, data signals G41, G42, G43, G44, . . . may be provided to pixels PG41, PG42, PG43, PG44, . . . connected to the data lines DL2, DL4, DL6, DL8, . . . connected to the second switch SW2 from among the pixels PB41, PG41, PR42, PG42, PB43, PG43, PR44, PG44, . . . connected to the n$^{th}$ gate line GLn. During the second line time LT2, data signals B41, R42, B43, R44, . . . may be provided to pixels PB41, PR42, PB43, PR44, . . . connected to the data lines DL1, DL3, DL5, DL7, . . . connected to the first switch SW1 from among the pixels PB41, PG41, PR42, PG42, PB43, PG43, PR44, PG44, . . . connected to the n$^{th}$ gate line GLn.

According to the above method, the data signal DATA[1] provided by the data driver 150 to the first output line OL1 may be in a sequence of data signals R11, G11, G21, B21, R31, G31, G41, B41, . . . , and the data signal DATA[2] provided to the second output line OL2 may be in a sequence of data signals B12, G12, G22, R22, B32, G32, G42, R42, . . . . That is, in units of two output lines, the data driver 150 may consecutively output the data signal R of the first pixel PR and the data signal B of the second pixel PB to one of two output lines and output the data signal G of the third pixel PG to the other output line consequently two times in a row.

Figure 7:
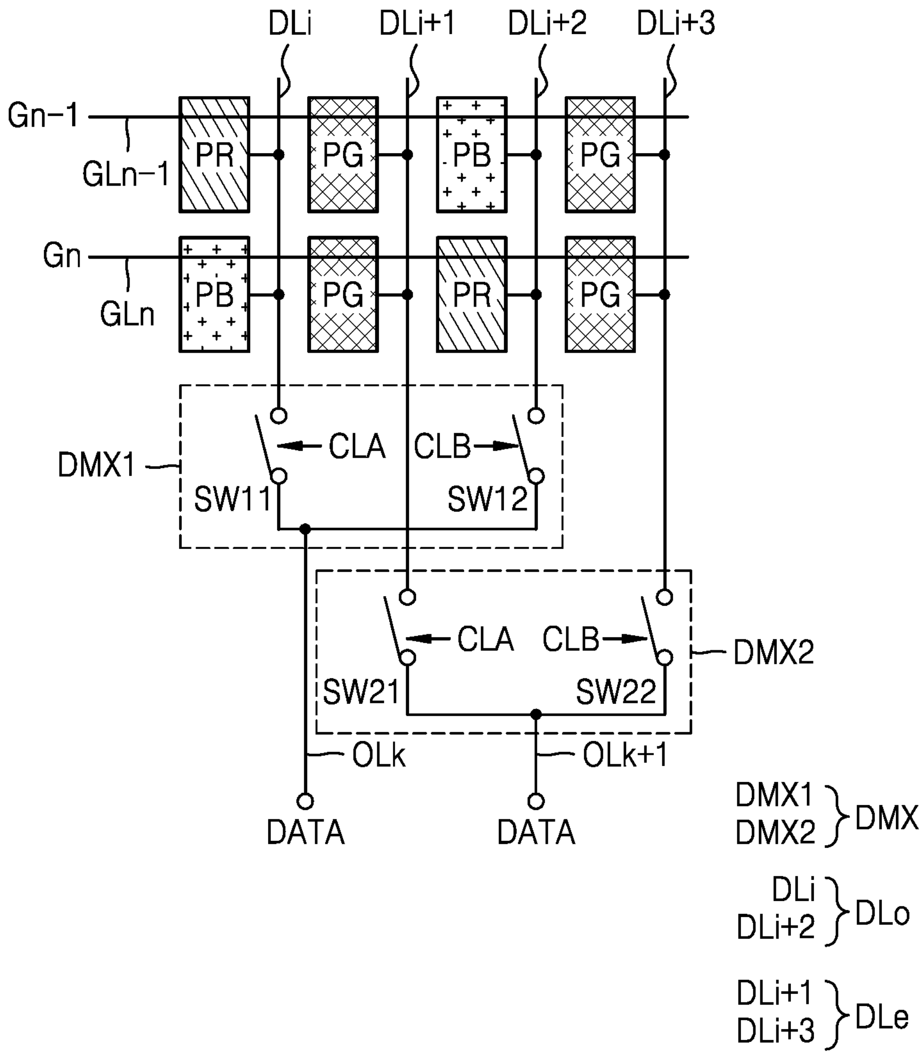
FIG. 7 is a diagram including a demultiplexer according to an embodiment.

FIG. 7 is a diagram including a demultiplexer according to an embodiment. The descriptions already provided with reference to FIG. 4 are not repeated.

Referring to FIG. 7, the data distributor 170 may include demultiplexers DMX. The demultiplexers DMX may include a first demultiplexer DMX1 and a second demultiplexer DMX2. The first demultiplexer DMX1 may connect the k$^{th}$ output line OLk selectively to the i$^{th}$ data line DLi and the (i+2)$^{th}$ data line DLi+2. The second demultiplexer DMX2 may connect the (k+1)$^{th}$ output line OLk+1 selectively to the (i+1)$^{th}$ data line DLi+1 and the (i+3)$^{th}$ data line DLi+3.

The first demultiplexer DMX1 may include a first switch SW11 and a second switch SW12.

The first switch SW11 may be arranged between the $k^{th}$ output line OLk and the $i^{th}$ data line DLi. The first switch SW11 may connect the $k^{th}$ output line OLk to the $i^{th}$ data line DLi in response to the first control signal CLA and apply the data signal DATA, which is applied to the $k^{th}$ output line OLk, to the $i^{th}$ data line DLi.

The second switch SW12 may be arranged between the $k^{th}$ output line OLk and the $(i+2)^{th}$ data line DLi+2. The second switch SW12 may connect the $k^{th}$ output line OLk to the $(i+2)^{th}$ data line DLi+2 in response to the second control signal CLB and apply the data signal DATA, which is applied to the $k^{th}$ output line OLk, to the $(i+2)^{th}$ data line DLi+2.

The second demultiplexer DMX2 may include a first switch SW21 and a second switch SW22.

The first switch SW21 may be arranged between the $(k+1)^{th}$ output line OLk+1 and the $(i+1)^{th}$ data line DLi+1. The first switch SW21 may connect the $(k+1)^{th}$ output line OLk+1 to the $(i+1)^{th}$ data line DLi+1 in response to the first control signal CLA and apply the data signal DATA, which is applied to the $(k+1)^{th}$ output line OLk+1, to the $(i+1)^{th}$ data line DLi+1.

The second switch SW22 may be arranged between the $(k+1)^{th}$ output line OLk+1 and the $(i+3)^{th}$ data line DLi+3. The second switch SW22 may connect the $(k+1)^{th}$ output line OLk+1 to the $(i+3)^{th}$ data line DLi+3 in response to the second control signal CLB and apply the data signal DATA, which is applied to the $k^{th}$ output line OLk, to the $(i+3)^{th}$ data line DLi+3.

FIG. 7 shows an example in which the $i^{th}$ data line DLi and the $(i+2)^{th}$ data line DLi+2 are odd data lines DLo and the $(i+1)^{th}$ data line DLi+1 and the $(i+3)^{th}$ data line DLi+3 are even data lines DLe. A pair of data lines connected to the first demultiplexer DMX1 may be a pair of odd data lines that are spaced apart from each other by a two-column interval, and a pair of data lines connected to the second demultiplexer DMX2 may be a pair of even data lines that are spaced apart from each other by a two-column interval.

Figure 8:
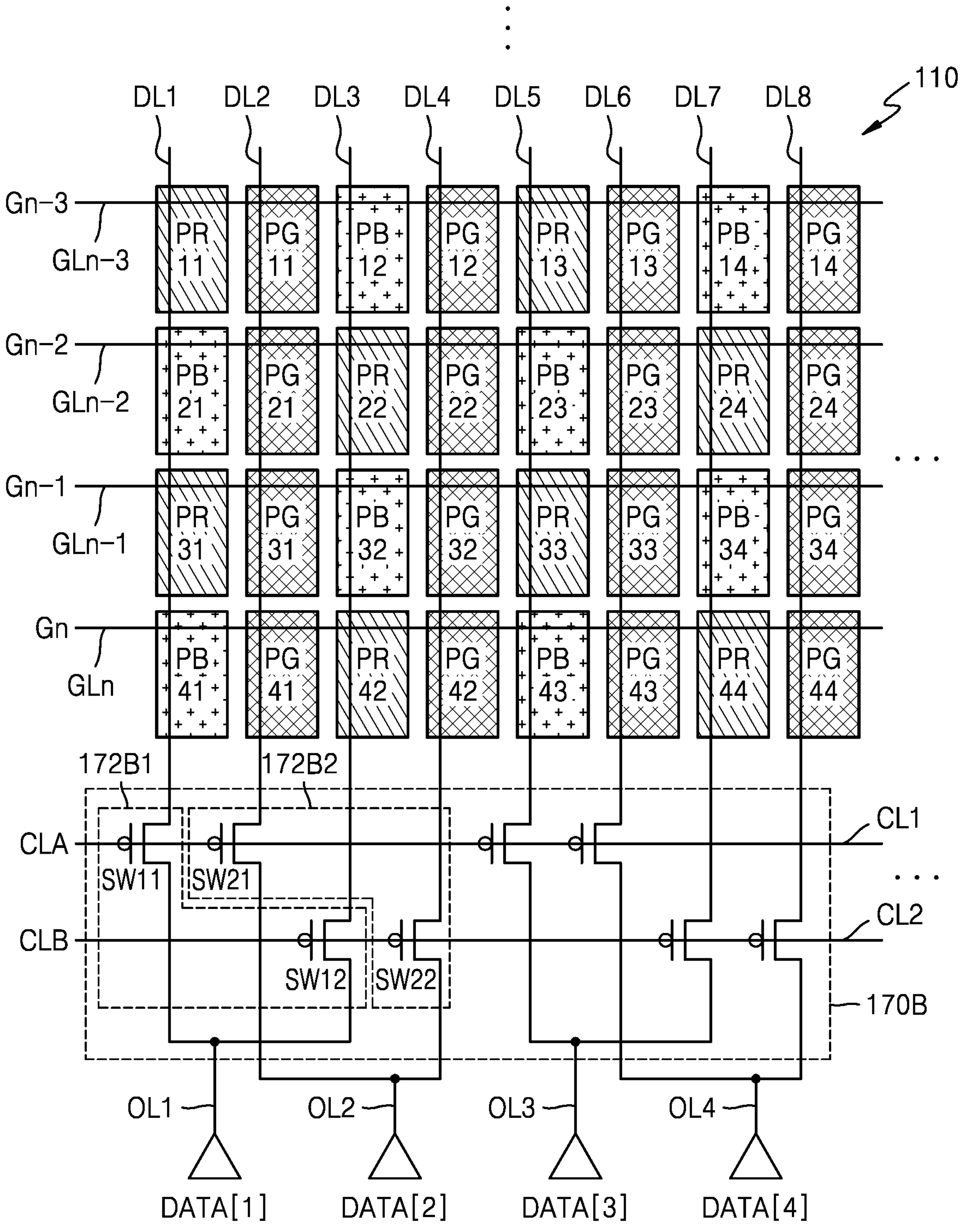
FIG. 8 is a diagram including a demultiplexer according to an embodiment.
Figure 9:
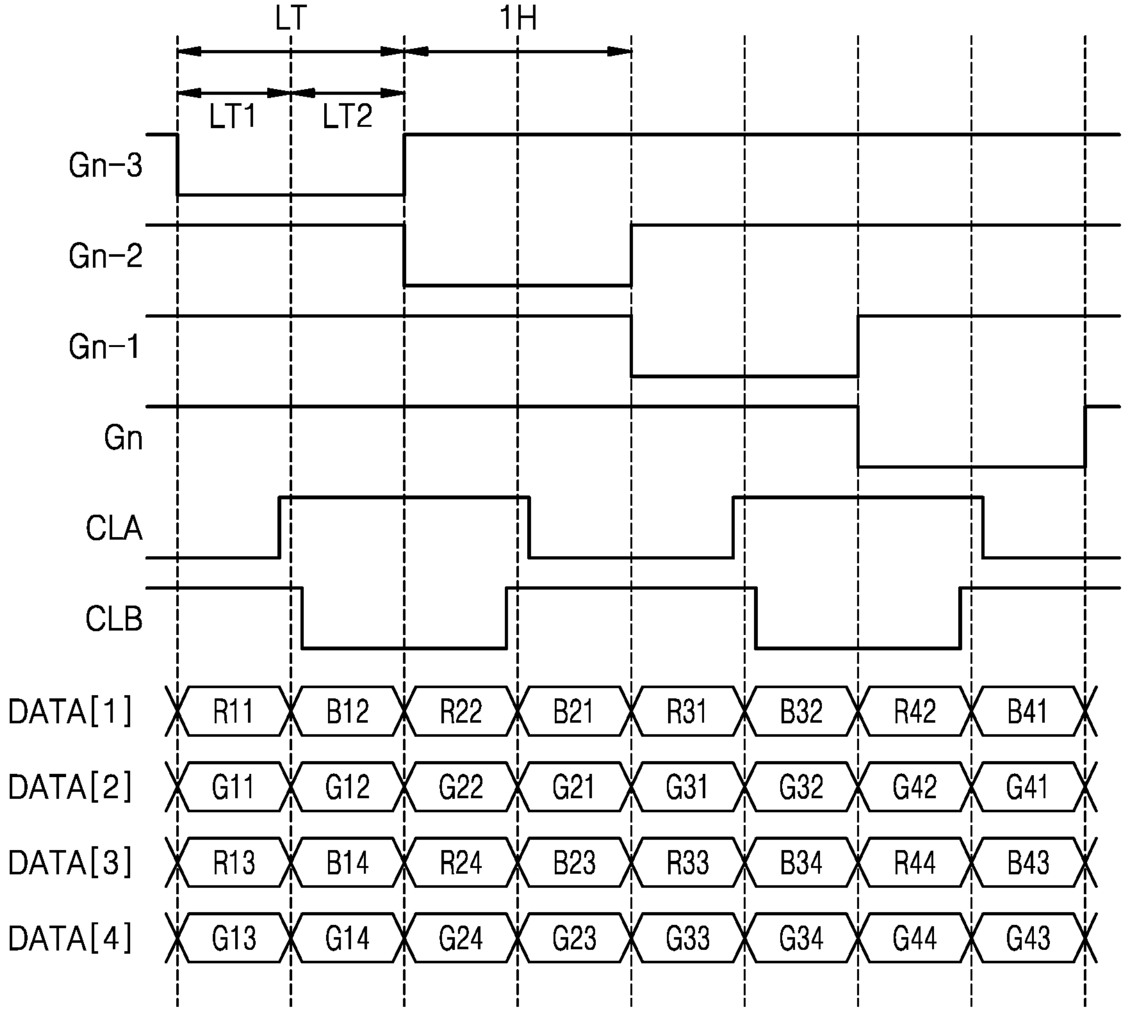
FIG. 9 is a timing diagram of an operation of the demultiplexer of FIG. 8.

FIG. 8 is a diagram including a demultiplexer according to an embodiment. FIG. 9 is a timing diagram of an operation of the demultiplexer of FIG. 8. The demultiplexer of FIG. 8 is an example to which the demultiplexer of FIG. 7 is applied. Hereinafter, the descriptions already provided with reference to FIGS. 5 and 6 are not repeated.

Referring to FIG. 8, a data distributor 170B may include first demultiplexers 172B1 and second demultiplexers 172B2, and the pixel unit 110 may include the pixels P. In an embodiment, a pair of data lines connected to the first demultiplexer 172B1 may be a pair of odd data lines. A pair of data lines connected to the second demultiplexer 172B2 may be a pair of even data lines. Hereinafter, the first demultiplexer 172B1 connected to the first output line OL1 and the second demultiplexer 172B2 connected to the second output line OL2 are described, and the same descriptions may be applied to the first demultiplexers 172B1 and the second demultiplexers 172B2 connected to other output lines.

The first demultiplexer 172B1 may include a first switch SW11 and a second switch SW12.

The first switch SW11 may be arranged between the first output line OL1 and the first data line DL1. The first switch SW11 may be a transistor that includes a gate connected to the first control line CL1, a first terminal connected to the first output line OL1, and a second terminal connected to the first data line DL1. The first switch SW11 may be turned on in response to the first control signal CLA applied from the first control line CL1, connect the first output line OL1 to the first data line DL1, and apply the data signal DATA, which is applied to the first output line OL1, to the first data line DL1.

The second switch SW12 may be arranged between the first output line OL1 and a third data line DL3. The second switch SW12 may be a transistor that includes a gate connected to the second control line CL2, a first terminal connected to the first output line OL1, and a second terminal connected to the third data line DL3. The second switch SW12 may be turned on in response to the second control signal CLB applied from the second control line CL2, connect the first output line OL1 to the third data line DL3, and apply the data signal DATA, which is applied to the first output line OL1, to the third data line DL3.

The second demultiplexer 172B2 may include a first switch SW21 and a second switch SW22.

The first switch SW21 may be arranged between the second output line OL2 and the second data line DL2. The first switch SW21 may be a transistor that includes a gate connected to the first control line CL1, a first terminal connected to the second output line OL2, and a second terminal connected to the second data line DL2. The first switch SW11 may be turned on in response to the first control signal CLA applied from the first control line CL1, connect the second output line OL2 to the second data line DL2, and apply the data signal DATA, which is applied to the second output line OL2, to the second data line DL2.

The second switch SW22 may be arranged between the second output line OL2 and the fourth data line DL4. The second switch SW22 may be a transistor that includes a gate connected to the second control line CL2, a first terminal connected to the second output line OL2, and a second terminal connected to the fourth data line DL4. The second switch SW22 may be turned on in response to the second control signal CLB applied from the second control line CL2, connect the second output line OL2 to the fourth data line DL4, and apply the data signal DATA, which is applied to the second output line OL2, to the fourth data line DL4.

Referring to FIG. 9, when the $(n-3)^{th}$ gate signal Gn−3 is provided to the $(n-3)^{th}$ gate line GLn−3 during the line time LT, pixels PR11, PG11, PB12, PG12, PR13, PG13, PB14, PG14, . . . connected to the $(n-3)^{th}$ gate line GLn−3 may be selected, and the data driver 150 may output the data signals DATA[1], DATA[2], DATA[3], DATA[4], . . . To the output lines OL1, OL2, OL3, OL4, . . . . In this case, the first control signal CLA may be provided to the first switches SW11 and SW21 of the first demultiplexers 172B1 and the second demultiplexers 172B2 during the first line time LT1, and the second control signal CLB may be provided to the second switches SW12 and SW22 of the first demultiplexers 172B1 and the second demultiplexers 172B2 during the second line time LT2. Accordingly, during the first line time LT1, data signals R11, G11, R13, G13, . . . may be provided to the pixels PR11, PG11, PR13, PG13, . . . connected to the data lines DL1, DL2, DL5, DL6, . . . connected to the first switches SW11 and SW21 from among the pixels PR11, PG11, PB12, PG12, PR13, PG13, PB14, PG14, . . . connected to the $(n-3)^{th}$ gate line GLn−3. During the second line time LT2, data signals B12, G12, B14, G14, . . . may be provided to the pixels PB12, PG12, PB14, PG14, . . . connected to the data lines DL3, DL4, DL7, DL8, . . . connected to the second switches SW12 and SW22 from among the pixels PR11, PG11, PB12, PG12, PR13, PG13, PB14, PG14, . . . connected to the $(n-3)^{th}$ gate line GLn−3.

And then, when the $(n-2)^{th}$ gate signal Gn−2 is provided to the $(n-2)^{th}$ gate line GLn−2 during the line time LT, pixels PB21, PG21, PR22, PG22, PB23, PG23, PR24, PG24, . . .

connected to the (n−2)$^{th}$ gate line GLn−2 may be selected, and the data driver 150 may output the data signals DATA [1], DATA[2], DATA[3], DATA[4], . . . to the output lines OL1, OL2, OL3, OL4, . . . . In this case, the second control signal CLB may be provided to the second switches SW12 and SW22 of the first demultiplexers 172B1 and the second demultiplexers 172B2 during the first line time LT1, and the first control signal CLA may be provided to the first switches SW11 and SW21 of the first demultiplexers 172B1 and the second demultiplexers 172B2 during the second line time LT2. Accordingly, during the first line time LT1, data signals R22, G22, R24, G24, . . . may be provided to pixels PR22, PG22, PR24, PG24, . . . connected to the data lines DL3, DL4, DL7, DL8, . . . connected to the second switches SW12 and SW22 from among the pixels PB21, PG21, PR22, PG22, PB23, PG23, PR24, PG24, . . . connected to the (n−2)$^{th}$ gate line GLn−2. During the second line time LT2, data signals B21, G21, B23, G23, . . . may be provided to pixels PB21, PG21, PB23, PG23, . . . connected to the data lines DL1, DL2, DL5, DL6, . . . connected to the first switches SW11 and SW21 from among the pixels PB21, PG21, PR22, PG22, PB23, PG23, PR24, PG24, . . . connected to the (n−2)$^{th}$ gate line GLn−2.

Then, when the (n−1)$^{th}$ gate signal Gn−1 is provided to the (n−1)$^{th}$ gate line GLn−1 during the line time LT, pixels PR31, PG31, PB32, PG32, PR33, PG33, PB34, PG34, . . . connected to the (n−1)$^{th}$ gate line GLn−1 may be selected, and the data driver 150 may output the data signals DATA [1], DATA[2], DATA[3], DATA[4], . . . to the output lines OL1, OL2, OL3, OL4, . . . . In this case, the first control signal CLA may be provided to the first switches SW11 and SW21 of the first demultiplexers 172B1 and the second demultiplexers 172B2 during the first line time LT1, and the second control signal CLB may be provided to the second switches SW12 and SW22 of the first demultiplexers 172B1 and the second demultiplexers 172B2 during the second line time LT2. Accordingly, during the first line time LT1, data signals R31, G31, R33, G33, . . . may be provided to the pixels PR31, PG31, PR33, PG33, . . . connected to the data lines DL1, DL2, DL5, DL6, . . . connected to the first switches SW11 and SW21 from among the pixels PR31, PG31, PB32, PG32, PR33, PG33, PB34, PG34, . . . connected to the (n−1)$^{th}$ gate line GLn−1. During the second line time LT2, data signals B32, G32, B34, G34, . . . may be provided to pixels PB32, PG32, PB34, PG34, . . . connected to the data lines DL3, DL4, DL7, DL8, . . . connected to the second switches SW12 and SW22 from among the pixels PR31, PG31, PB32, PG32, PR33, PG33, PB34, PG34, . . . connected to the (n−1)$^{th}$ gate line GLn−1.

Then, when the n$^{th}$ gate signal Gn is provided to the n$^{th}$ gate line GLn during the line time LT, pixels PB41, PG41, PR42, PG42, PB43, PG43, PR44, PG44, . . . connected to the n$^{th}$ gate line GLn may be selected, and the data driver 150 may output the data signals DATA[1], DATA[2], DATA[3], DATA[4], . . . to the output lines OL1, OL2, OL3, OL4, . . . . In this case, the second control signal CLB may be provided to the second switches SW12 and SW22 of the first demultiplexers 172B1 and the second demultiplexers 172B2 during the first line time LT1, and the first control signal CLA may be provided to the first switches SW11 and SW21 of the first demultiplexers 172B1 and the second demultiplexers 172B2 during the second line time LT2. Accordingly, during the first line time LT1, data signals R42, G42, R44, G44, . . . may be provided to the pixels PR42, PG42, PR44, PG44, . . . connected to the data lines DL3, DL4, DL7, DL8, . . . connected to the second switches SW12 and SW22 from among the pixels PB41, PG41, PR42, PG42, PB43, PG43, PR44, PG44, . . . connected to the n$^{th}$ gate line GLn. During the second line time LT2, data signals B41, G41, B43, RG43, . . . may be provided to the pixels PB41, PG41, PB43, PG43, . . . connected to the data lines DL1, DL2, DL5, DL6, . . . connected to the first switches SW11 and SW21 from among the pixels PB41, PG41, PR42, PG42, PB43, PG43, PR44, PG44, . . . connected to the n$^{th}$ gate line GLn.

According to the above method, the data signal DATA[1] provided by the data driver 150 to the first output line OL1 may be in a sequence of data signals R11, B12, R22, B21, R31, B32, R42, B41, . . . , and the data signal DATA[2] provided to the second output line OL2 may be in a sequence of data signals G11, G12, G22, G21, G31, G32, G42, G41, . . . . That is, the data driver 150 may output the data signal R of the first pixel PR and the data signal B of the second pixel PB to the odd output lines OL1, OL3, . . . and the data signal G of the third pixel PG to the even output lines OL2, OL4, . . . .

Figure 10:
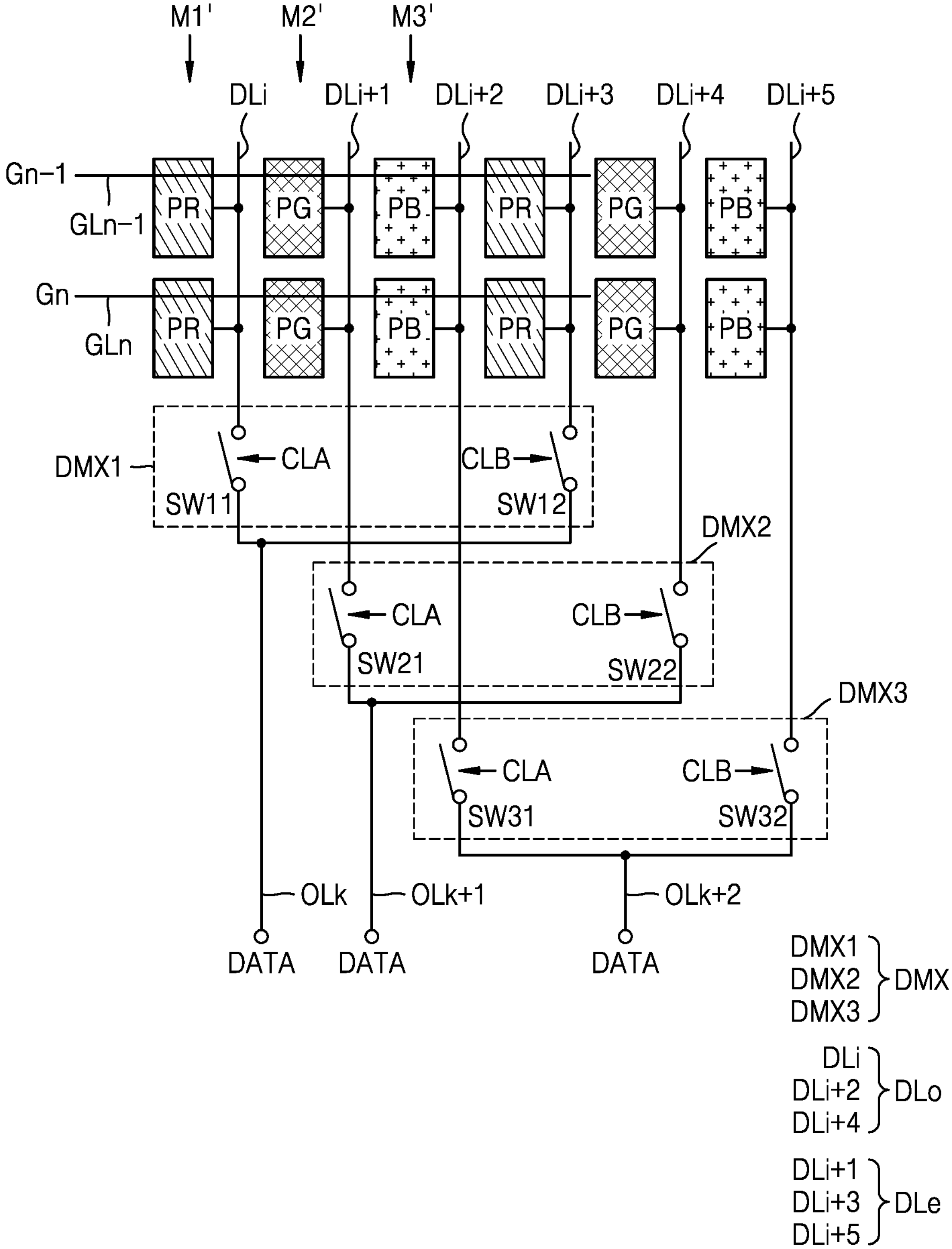
FIG. 10 is a diagram including a demultiplexer according to an embodiment.

FIG. 10 is a diagram including a demultiplexer according to an embodiment. The descriptions already provided with reference to FIG. 4 are not repeated.

Referring to FIG. 10, a data distributor 170 may include demultiplexers DMX. The demultiplexers DMX may include first demultiplexers DMX1, second demultiplexers DMX2, and third demultiplexers DMX3. The first demultiplexer DMX1 may connect the k$^{th}$ output line OLk selectively to the i$^{th}$ data line DLi and the (i+3)$^{th}$ data line DLi+3. The second demultiplexer DMX2 may connect the (k+1)$^{th}$ output line OLk+1 selectively to the (i+1)$^{th}$ data line DLi+1 and an (i+4)$^{th}$ data line DLi+4. The third demultiplexer DMX3 may connect a (k+2)$^{th}$ output line OLk+2 selectively to the (i+2)$^{th}$ data line DLi+2 and an (i+5)$^{th}$ data line DLi+5.

The first demultiplexer DMX1 may include the first switch SW11 and the second switch SW12.

The first switch SW11 may be arranged between the k$^{th}$ output line OLk and the i$^{th}$ data line DLi. The first switch SW11 may connect the k$^{th}$ output line OLk to the i$^{th}$ data line DLi in response to the first control signal CLA and apply the data signal DATA, which is applied to the k$^{th}$ output line OLk, to the i$^{th}$ data line DLi.

The second switch SW12 may be arranged between the k$^{th}$ output line OLk and the (i+3)$^{th}$ data line DLi+3. The second switch SW12 may connect the k$^{th}$ output line OLk to the (i+3)$^{th}$ data line DLi+3 in response to the second control signal CLB and apply the data signal DATA, which is applied to the k$^{th}$ output line OLk, to the (i+3)$^{th}$ data line DLi+3.

The second demultiplexer DMX2 may include the first switch SW21 and the second switch SW22.

The first switch SW21 may be arranged between the (k+1)$^{th}$ output line OLk+1 and the (i+1)$^{th}$ data line DLi+1. The first switch SW21 may connect the (k+1)$^{th}$ output line OLk+1 to the (i+1)$^{th}$ data line DLi+1 in response to the first control signal CLA and apply the data signal DATA, which is applied to the (k+1)$^{th}$ output line OLk+1, to the (i+1)$^{th}$ data line DLi+1.

The second switch SW22 may be arranged between the (k+1)th output line OLk+1 and the (i+4)$^{th}$ data line DLi+4. The second switch SW22 may connect the (k+1)$^{th}$ output line OLk+1 to the (i+4)$^{th}$ data line DLi+4 in response to the second control signal CLB and apply the data signal DATA, which is applied to the (k+1)$^{th}$ output line OLk+1, to the (i+4)$^{th}$ data line DLi+4.

The third demultiplexer DMX3 may include a first switch SW31 and a second switch SW32.

The first switch SW31 may be arranged between the $(k+2)^{th}$ output line OLk+2 and the $(i+2)^{th}$ data line DLi+2. The first switch SW31 may connect the $(k+2)^{th}$ output line OLk+1 to the $(i+2)^{th}$ data line DLi+2 in response to the first control signal CLA and apply the data signal DATA, which is applied to the $(k+2)^{th}$ output line OLk+2, to the $(i+2)^{th}$ data line DLi+2.

The second switch SW32 may be arranged between the $(k+2)^{th}$ output line OLk+2 and the $(i+5)^{th}$ data line DLi+5. The second switch SW32 may connect the $(k+2)^{th}$ output line OLk+1 to the $(i+5)^{th}$ data line DLi+5 in response to the second control signal CLB and apply the data signal DATA, which is applied to the $(k+2)^{th}$ output line OLk+2, to the $(i+5)^{th}$ data line DLi+5.

The pixels P may include first pixels PR, second pixels PB, and third pixels PG that emit different colors of light. In an embodiment, the first pixels PR may be repeatedly arranged in a column M1' in which the $i^{th}$ data line DLi is arranged, and the first pixels PR may be connected to the $i^{th}$ data line DLi. The third pixels PG may be repeatedly arranged in a column M2' in which the $(i+1)^{th}$ data line DLi+1 is arranged, and the third pixels PG may be connected to the $(i+1)^{th}$ data line DLi+1. The second pixels PB may be repeatedly arranged in a column M3' in which the $(i+2)^{th}$ data line DLi+2 is arranged, and the second pixels PB may be connected to the $(i+2)^{th}$ data line DLi+2. FIG. 10 shows an example in which the $i^{th}$ data line DLi, the $(i+2)^{th}$ data line DLi+2, and the $(i+4)^{th}$ data line DLi+4 are the odd data lines DLo, and the $(i+1)^{th}$ data line DLi+1, the $(i+3)^{th}$ data line DLi+3, and the $(i+5)^{th}$ data line DLi+5 are the even data lines DLe. A pair of data lines connected to the first demultiplexer DMX1 may be data lines connected to the first pixels PR arranged by a three-column interval, a pair of data lines connected to the second demultiplexer DMX2 may be data lines connected to the third pixels PG arranged by a three-column interval, and a pair of data lines connected to the third demultiplexer DMX3 may be data lines connected to the second pixels PB arranged by a three-column interval.

Figure 11:
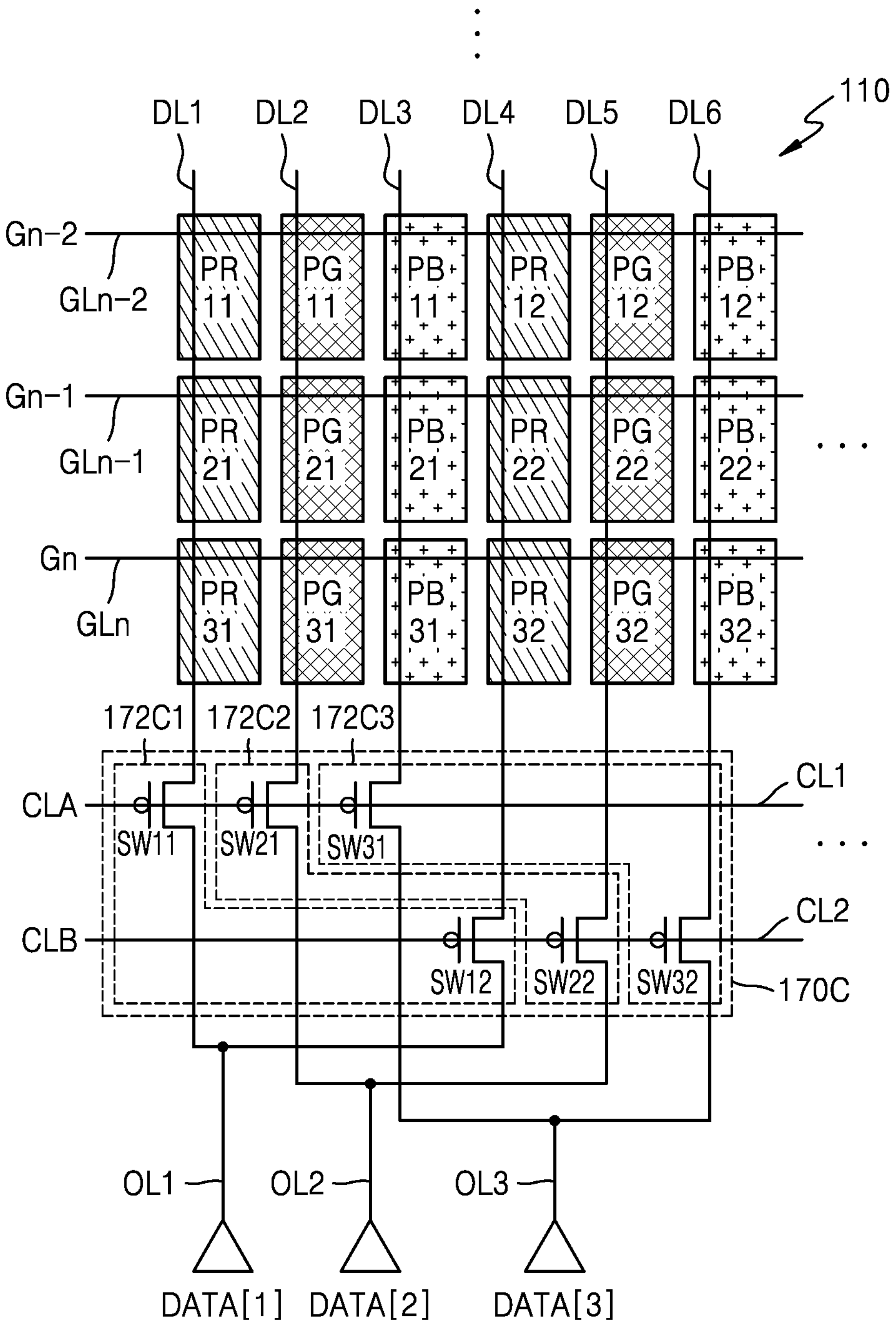
FIG. 11 is a diagram including a demultiplexer according to an embodiment.
Figure 12:
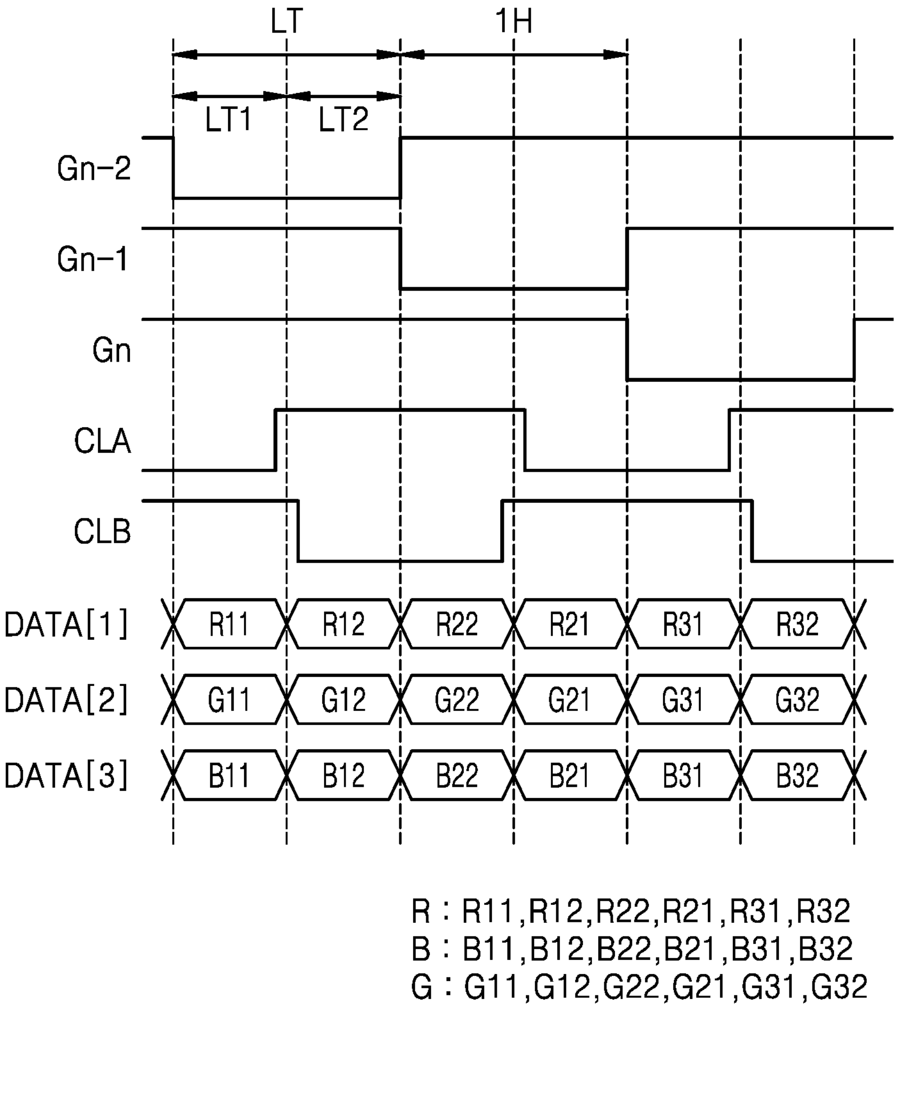
FIG. 12 is a timing diagram of an operation of the demultiplexer of FIG. 11.

FIG. 11 is a diagram including a demultiplexer according to an embodiment. FIG. 12 is a timing diagram of an operation of the demultiplexer of FIG. 11. The demultiplexer of FIG. 11 is an example to which the demultiplexer of FIG. 10 is applied. The descriptions already provided with reference to FIGS. 5 and 6 are not repeated.

Referring to FIG. 11, a data distributor 170C may include first demultiplexers 172C1, second demultiplexers 172C2, and third demultiplexers 172C3.

In the pixel unit 110, a column in which the first pixels PR are repeatedly arranged, a column in which the third pixels PG are repeatedly arranged, and a column in which the second pixels PB are alternately arranged, may be alternately repeated in a row direction. In the pixel unit 110, gate lines and data lines may be arranged. In an embodiment, a pair of data lines connected to the first demultiplexer 172C1 may be data lines arranged by a three-column interval in columns in which the first pixels PR are repeatedly arranged. A pair of data lines connected to the second demultiplexer 172C2 may be data lines arranged by a three-column interval in columns in which the third pixels PG are repeatedly arranged. A pair of data lines connected to the third demultiplexer 172C3 may be data lines arranged by a three-column interval in columns in which the second pixels PB are repeatedly arranged. Hereinafter, the first demultiplexer 172C1 connected to the first output line OL1, the second demultiplexer 172C2 connected to the second output line OL2, and the third demultiplexer 172C3 connected to the third output line OL3 are described as examples, and the same descriptions may be applied to the first demultiplexers 172C1 to the third demultiplexers 172C3 connected to other output lines.

The first demultiplexer 172C1 may include a first switch SW11 and a second switch SW12.

The first switch SW11 may be arranged between the first output line OL1 and the first data line DL1. The first switch SW11 may be a transistor that includes a gate connected to the first control line CL1, a first terminal connected to the first output line OL1, and a second terminal connected to the first data line DL1. The first switch SW11 may be turned on in response to the first control signal CLA applied from the first control line CL1, connect the first output line OL1 to the first data line DL1, and apply the data signal DATA, which is applied to the first output line OL1, to the first data line DL1.

The second switch SW12 may be arranged between the first output line OL1 and the fourth data line DL4. The second switch SW12 may be a transistor that includes a gate connected to the second control line CL2, a first terminal connected to the first output line OL1, and a second terminal connected to the fourth data line DL4. The second switch SW12 may be turned on in response to the second control signal CLB applied from the second control line CL2, connect the first output line OL1 to the fourth data line DL4, and apply the data signal DATA, which is applied to the first output line OL1, to the fourth data line DL4.

The second demultiplexer 172C2 may include a first switch SW21 and a second switch SW22.

The first switch SW21 may be arranged between the second output line OL2 and the second data line DL2. The first switch SW21 may be a transistor that includes a gate connected to the first control line CL1, a first terminal connected to the second output line OL2, and a second terminal connected to the second data line DL2. The first switch SW21 may be turned on in response to the first control signal CLA applied from the first control line CL1, connect the second output line OL2 to the second data line DL2, and apply the data signal DATA, which is applied to the second output line OL2, to the second data line DL2.

The second switch SW22 may be arranged between the second output line OL2 and a fifth data line DL5. The second switch SW22 may be a transistor that includes a gate connected to the second control line CL2, a first terminal connected to the second output line OL2, and a second terminal connected to the fifth data line DL5. The second switch SW22 may be turned on in response to the second control signal CLB applied from the second control line CL2, connect the second output line OL2 to the fifth data line DL5, and may apply the data signal DATA, which is applied to the second output line OL2, to the fifth data line DL5.

The third demultiplexer 172C3 may include the first switch SW31 and the second switch SW32.

The first switch SW31 may be arranged between the third output line OL3 and the third data line DL3. The first switch SW31 may be a transistor that includes a gate connected to the first control line CL1, a first terminal connected to the third output line OL3, and a second terminal connected to the third data line DL3. The first switch SW31 may be turned on in response to the first control signal CLA applied from the first control line CL1, connect the third output line OL3 to the third data line DL3, and apply the data signal DATA, which is applied to the third output line OL3, to the third data line DL3.

The second switch SW32 may be arranged between the third output line OL3 and the sixth data line DL6. The second switch SW32 may be a transistor that includes a gate connected to the second control line CL2, a first terminal connected to the third output line OL3, and a second terminal connected to the sixth data line DL6. The second switch SW32 may be turned on in response to the second control signal CLB applied from the second control line CL2, connect the third output line OL3 to the sixth data line DL6, and apply the data signal DATA, which is applied to the third output line OL3, to the sixth data line DL6.

Referring to FIG. 12, when the (n−2)$^{th}$ gate signal Gn−2 is provided to the (n−2)$^{th}$ gate line GLn−2 during the line time LT, pixels PR11, PG11, PB11, PR12, PG12, PB12, . . . connected to the (n−2)$^{th}$ gate line GLn−2 may be selected, and the data driver 150 may output the data signals DATA[1], DATA[2], DATA[3], . . . to the output lines OL1, OL2, OL3, . . . . In this case, the first control signal CLA may be provided to the first switches SW11, SW21, and SW31 of the first demultiplexers 172C1, the second demultiplexers 172C2, and the third demultiplexers 172C3 during the first line time LT1, and the second control signal CLB may be provided to the second switches SW12, SW22, and SW32 of the first demultiplexers 172C1, the second demultiplexers 172C2, and the third demultiplexers 172C3 during the second line time LT2. Accordingly, during the first line time LT1, data signals R11, G11, B11, . . . may be provided to pixels PR11, PG11, PB11, . . . connected to the data lines DL1, DL2, DL3, . . . connected to the first switches SW11, SW21, and SW31 from among the pixels PR11, PG11, PB11, PR12, PG12, PB12, . . . connected to the (n−2)$^{th}$ gate line GLn−2. During the second line time LT2, data signals R12, G12, B12, . . . may be provided to the pixels PR12, PG12, PB12, . . . connected to the data lines DL4, DL5, DL6, . . . connected to the second switches SW12, SW22, and SW32 from among the pixels PR11, PG11, PB11, PR12, PG12, PB12, . . . connected to the (n−2)$^{th}$ gate line GLn−2.

Next, when the (n−1)$^{th}$ gate signal Gn−1 is provided to the (n−1)$^{th}$ gate line GLn−1 during the line time LT, pixels PR21, PG21, PB21, PR22, PG22, PB22, . . . connected to the (n−1)$^{th}$ gate line GLn−1 may be selected, and the data driver 150 may output the data signals DATA[1], DATA[2], DATA[3], . . . to the output lines OL1, OL2, OL3, . . . . In this case, the second control signal CLB may be provided to the second switches SW12, SW22, and SW32 of the first demultiplexers 172C1, the second demultiplexers 172C2, and the third demultiplexers 172C3 during the first line time LT1, and the first control signal CLA may be provided to the first switches SW11, SW21, and SW31 of the first demultiplexers 172C1, the second demultiplexers 172C2, and the third demultiplexers 172C3 during the second line time LT2. Accordingly, during the first line time LT1, data signals R22, G22, B22, . . . may be provided to pixels PR22, PG22, PB22, . . . connected to the data lines DL4, DL5, DL6, . . . connected to the second switches SW12, SW22, and SW32 from among the pixels PR21, PG21, PB21, PR22, PG22, PB22, . . . connected to the (n−1)$^{th}$ gate line GLn−1. During the second line time LT2, data signals R21, G21, B21, . . . may be provided to pixels PR21, PG21, PB21, . . . connected to the data lines DL1, DL2, DL3, . . . connected to the first switches SW11, SW21, and SW31 from among the pixels PR21, PG21, PB21, PR22, PG22, PB22, . . . connected to the (n−1)$^{th}$ gate line GLn−1.

Then, when the n$^{th}$ gate signal Gn is provided to the n$^{th}$ gate line GLn during the line time LT, pixels PR31, PG31, PB31, PR32, PG32, PB32, . . . connected to the n$^{th}$ gate line GLn may be selected, and the data driver 150 may output the data signals DATA[1], DATA[2], DATA[3], . . . to the output lines OL1, OL2, OL3, . . . . In this case, the first control signal CLA may be provided to the first switches SW11, SW21, and SW31 of the first demultiplexers 172C1, the second demultiplexers 172C2, and the third demultiplexers 172C3 during the first line time LT1, and the second control signal CLB may be provided to the second switches SW12, SW22, and SW32 of the first demultiplexers 172C1, the second demultiplexers 172C2, and the third demultiplexers 172C3 during the second line time LT2. Accordingly, during the first line time LT1, data signals R31, G31, B31, . . . may be provided to pixels PR31, PG31, PB31, . . . connected to the data lines DL1, DL2, DL3, . . . connected to the first switches SW11, SW21, and SW31 from among the pixels PR31, PG31, PB31, PR32, PG32, PB32, . . . connected to the n$^{th}$ gate line GLn. During the second line time LT2, data signals R32, G32, B32, . . . may be provided to pixels PR32, PG32, PB32, . . . connected to the data lines DL4, DL5, DL6, . . . connected to the second switches SW12, SW22, and SW32 from among the pixels PR31, PG31, PB31, PR32, PG32, PB32, . . . connected to the n$^{th}$ gate line GLn.

According to the above method, the data signal DATA[1] provided by the data driver 150 to the first output line OL1 may be in a sequence of data signals R11, R12, R22, R21, R31, R32, . . . , the data signal DATA[2] provided to the second output lines OL2 may be in a sequence of data signals G11, G12, G22, G21, G31, G32, . . . , and the data signal DATA[3] provided to the third output line OL3 may be in a sequence of data signals B11, B12, B22, B21, B31, B32, . . . . That is, in units of three output lines, the data driver 150 may output the data signal R of the first pixel PR to one of three output lines, the data signal G of the third pixel PG to another output line, and the data signal B of the second pixel PB to the other output line.

While respectively driving control signals for controlling switches of demultiplexers during a line time of approximately 1H, a display apparatus according to the one or more embodiments may apply a data signal to a pixel in an m$^{th}$ column and an n$^{th}$ row (line) during a ½H period during which the control signal is applied and then apply a data signal to a pixel in the m$^{th}$ column and an (n+1)$^{th}$ row during the ½H period. In the display apparatus according to the one or more embodiments, as switching of the control signals is performed once during each line time (approximately 1H), a switching frequency may be reduced to half, compared to when switching of control signals is performed during each ½ line time. Accordingly, when the display apparatus is driven in a high frequency, the quality degradation resulting from external noise occurring because of an increase in a switching frequency of a control signal may be overcome, and thus, the amount of power consumed may be reduced.

The display apparatus according to the one or more embodiments may be realized as an electronic device such as a smartphone, a mobile phone, a smartwatch, a navigation device, a video game console, a television (TV), a head unit for vehicles, a laptop, a tablet computer, a Personal Media Player (PMP), or a Personal Digital Assistant (PDA). Also, the electronic device may be a flexible device.

According to the one or more embodiments, the number of output lines of a data driver may be reduced, and thus, manufacturing costs of a display apparatus may decrease. Also, the quality degradation of the display apparatus according to external noise introduced through data lines may be reduced. However, the scope of the disclosure is not limited by the effects.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A display apparatus comprising:

a pixel unit including a first data line and a second data line;

a data driving circuit configured to output data signals through a plurality of output lines;

a data distribution circuit including a first switch and a second switch, wherein the first switch connects a first output line among the plurality of output lines to the first data line in response to a first control signal, and the second switch connects the first output line to the second data line in response to a second control signal; and a control circuit configured to alternately output the first control signal and the second control signal during each line time of one frame, wherein the line time includes a first line time and a second line time subsequent to the first line time, wherein the control circuit is configured to consecutively output the first control signal during a second line time of a previous line time and a first line time of a current line time, and consecutively output the second control signal during a second line time of the current line time and a first line time of a next line time, wherein on-voltage period of each of the first control signal and the second control signal is equal to or less than one horizontal cycle.

2. The display apparatus of claim 1, wherein the data driving circuit is configured to output the data signal in synchronization with output timings of the first control signal and the second control signal during each line time.

3. The display apparatus of claim 1, wherein the second data line is spaced apart from the first data line by a one-column interval.

4. The display apparatus of claim 3, wherein the pixel unit includes a plurality of first pixels emitting light of a first color, a plurality of second pixels emitting light of a second color, and a plurality of third pixels emitting light of a third color, and wherein the plurality of first pixels and the plurality of second pixels are alternately arranged in a column direction and connected to the first data line, and the plurality of third pixels are repeatedly arranged in the column direction and connected to the second data line.

5. The display apparatus of claim 4, wherein the data driving circuit is configured to alternately output first color data and second color data to the first output line in synchronization with an output timing of the first control signal and output third color data to the first output line in synchronization with an output timing of the second control signal during each line time.

6. The display apparatus of claim 1, wherein the second data line is spaced apart from the first data line by a two-column interval.

7. The display apparatus of claim 6, wherein the pixel unit further includes:

a third data line arranged between the first data line and the second data line; and a plurality of first pixels emitting light of a first color, a plurality of second pixels emitting light of a second color, and a plurality of third pixels emitting light of a third color, wherein the plurality of first pixels and the plurality of second pixels are alternately arranged in a column direction and connected to the first data line and the second data line, and the plurality of third pixels are repeatedly arranged in the column direction and connected to the third data line, and wherein the data distribution circuit further includes a third switch connecting a second output line among the plurality of output lines to the third data line in response to the first control signal.

8. The display apparatus of claim 7, wherein the data driving circuit is configured to alternately output first color data and second color data to the first output line in synchronization with an output timing of the first control signal and the second control signal and output third color data to the second output line in synchronization with an output timing of the first control signal during each line time.

9. The display apparatus of claim 1, wherein the second data line is spaced apart from the first data line by a three-column interval.

10. The display apparatus of claim 9, wherein the pixel unit further includes:

a third data line arranged between the first data line and the second data line;

a fourth data line arranged between the third data line and the second data line;

a plurality of first pixels repeatedly arranged in a column direction, connected to the first data line, and emitting light of a first color;

a plurality of second pixels repeatedly arranged in the column direction, connected to the third data line, and emitting light of a second color; and a plurality of third pixels repeatedly arranged in the column direction, connected to the fourth data line, and emitting light of a third color, and wherein the data distribution circuit further includes a third switch, which connects a second output line among the plurality of output lines to the third data line in response to the first control signal, and a fourth switch, which connects a third output line among the plurality of output lines to the fourth data line in response to the first control signal.

11. The display apparatus of claim 10, wherein the data driving circuit is configured to output first color data to the first output line, second color data to the second output line, third color data to the third output line in synchronization with an output timing of the first control signal, and output the first color data to the first output line in synchronization with an output timing of the second control signal.

12. The display apparatus of claim 1, wherein the pixel unit further includes a plurality of gate lines, each of the plurality of gate lines being arranged in each row, and wherein a gate signal provided to each of the plurality of gate lines overlaps a portion of the first control signal and a portion of the second control signal.

13. A display apparatus comprising:

a pixel unit including a plurality of first pixels emitting light of a first color, a plurality of second pixels emitting light of a second color, and a plurality of third pixels emitting light of a third color, wherein the plurality of first pixels and the plurality of second pixels are alternately arranged in a column direction and connected to a first data line, and the plurality of third pixels are repeatedly arranged in the column direction and connected to a second data line;

a data driving circuit configured to output data signals through a plurality of output lines;

a data distribution circuit connecting the plurality of output lines to the first data line and the second data line in response to a control signal; and a control circuit configured to output the control signal, wherein the first data line and the second data line are alternately arranged in a row direction, wherein the data distribution circuit includes a plurality of demultiplexers selectively connecting each of the plurality of output lines to its corresponding pair of a first data line and a second data line during each line time of one frame, wherein the line time includes a first line time and a second line time subsequent to the first line time, wherein the control circuit is configured to alternately output a first control signal and a second control signal to the plurality of demultiplexers, wherein the first control signal is consecutively output during a second line time of a previous line time and a first line time of a current line time, and wherein the second control signal is consecutively output during a second line time of the current line time and a first line time of a next line time.

14. The display apparatus of claim 13, wherein the data driving circuit is configured to alternately output first color data and second color data to the plurality of output lines, respectively, in synchronization with an output timing of the first control signal and output third color data to the plurality of output lines, respectively, in synchronization with an output timing of the second control signal during each line time.

15. The display apparatus of claim 13, wherein each of the plurality of demultiplexers includes a first switch, which connects its corresponding output line among the plurality of output lines to the first data line, and a second switch, which connects its corresponding output line to the second data line in response to a second control signal.

16. The display apparatus of claim 13, wherein the pixel unit further includes a plurality of gate lines, each of the plurality of gate lines being arranged in each row, and wherein a gate signal provided to each of the plurality of gate lines overlaps a portion of the first control signal and a portion of the second control signal.

17. A display apparatus comprising:

a pixel unit including a plurality of first pixels emitting light of a first color, a plurality of second pixels emitting light of a second color, and a plurality of third pixels emitting light of a third color, wherein the plurality of first pixels and the plurality of second pixels are alternately arranged in a column direction and connected to a first data line, and the plurality of third pixels are repeatedly arranged in the column direction and connected to a second data line;

a data driving circuit configured to output data signals through a plurality of output lines;

a data distribution circuit connecting the plurality of output lines to the first data line and the second data line in response to a control signal; and a control circuit configured to output the control signal, wherein the first data line and the second data line are alternately arranged in a row direction, wherein the data distribution circuit includes a first demultiplexer, which selectively connects a first output line among the plurality of output lines to a pair of first data lines during each line time of one frame, and a second demultiplexer, which selectively connects a second output line among the plurality of output lines to a pair of second data lines during each line time of one frame, wherein the line time includes a first line time and a second line time subsequent to the first line time, wherein the control circuit is configured to alternately output a first control signal and a second control signal to the first demultiplexer and the second demultiplexer, respectively, wherein the first control signal is consecutively output during a second line time of a previous line time and a first line time of a current line time, and wherein the second control signal is consecutively output during a second line time of the current line time and a first line time of a next line time.

18. The display apparatus of claim 17, wherein the data driving circuit is configured to alternately output first color data and second color data to a plurality of first output lines in synchronization with output timings of the first control signal and the second control signal and output third color data to a plurality of second output lines in synchronization with the output timings of the first control signal and the second control signal during each line time.

19. The display apparatus of claim 17, wherein the first demultiplexer includes a pair of switches respectively connecting the first output line to the pair of first data lines, and wherein the second demultiplexer includes a pair of switches respectively connecting the second output line to the pair of second data lines.

20. The display apparatus of claim 17, wherein the pixel unit further includes a plurality of gate lines, each of the plurality of gate lines being arranged in each row, and wherein a gate signal provided to each of the plurality of gate lines overlaps a portion of the first control signal and a portion of the second control signal.

* * * * *